(12) United States Patent
Namihira

(10) Patent No.: US 9,628,410 B2
(45) Date of Patent: Apr. 18, 2017

(54) SWITCH AND SWITCH SYSTEM FOR ENABLING PATHS BETWEEN DOMAINS

(71) Applicant: FUJITSU LIMITED, Kawasaki-shi, Kanagawa (JP)

(72) Inventor: Daisuke Namihira, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 110 days.

(21) Appl. No.: 14/107,160

(22) Filed: Dec. 16, 2013

(65) Prior Publication Data

US 2014/0233581 A1    Aug. 21, 2014

(30) Foreign Application Priority Data

Feb. 21, 2013 (JP) .................................. 2013-032097

(51) Int. Cl.
  *H04L 12/931* (2013.01)
(52) U.S. Cl.
  CPC .................... *H04L 49/356* (2013.01)
(58) Field of Classification Search
  CPC ... H04L 12/44; H04L 2012/445; H04L 45/04; H04L 45/48
  See application file for complete search history.

(56) References Cited

U.S. PATENT DOCUMENTS

| 2011/0235524 A1* | 9/2011 | North et al. ................. 370/242 |
| 2012/0230325 A1 | 9/2012 | Haddock |
| 2012/0230344 A1 | 9/2012 | Haddock |
| 2012/0314715 A1 | 12/2012 | Janardhanan |
| 2014/0133486 A1* | 5/2014 | Sivasankar et al. .......... 370/392 |

FOREIGN PATENT DOCUMENTS

| JP | 11-103302 | 4/1999 |
| JP | 2005-522774 | 7/2005 |
| WO | WO 03/088050 A1 | 10/2003 |
| WO | WO 2011/140028 A1 | 11/2011 |

OTHER PUBLICATIONS

Extended European Search Report issued May 12, 2014 in Patent Application No. 13198023.7.
Office Action issued Aug. 2, 2016 in Japanese Patent Application No. 2013-032097 (with English translation of the relevant part, p. 1, line 28 to p. 2, line 10 of the Office Action).
Extended European Search Report issued on Jun. 15, 2016 in Patent Application No. 16155876.2.

* cited by examiner

*Primary Examiner* — Pao Sinkantarakorn
(74) *Attorney, Agent, or Firm* — Oblon, McClelland, Maier & Neustadt, L.L.P.

(57) ABSTRACT

A disclosed switch includes: ports that include a first port to be connected to another switch included in a first domain that includes plural switches to be virtually integrated, and a second port that is other than the first port; a first processing unit configured to obtain data of a switch included in the first domain through the first port; and a second processing unit configured to obtain data of switches included in a second domain that is adjacent to the first domain through the second port and obtain data of switches included in the second domain from the another switch included in the first domain to identify, from among the ports, plural ports that are connected to the second domain, perform a setting for the identified plural ports, and perform a first processing to make plural domains that include the first and second domains a tree structure.

13 Claims, 32 Drawing Sheets

| DOMAIN | ADDRESS | PARENT DOMAIN | FLAG REPRESENTING WHETHER DOMAIN HAS BEEN VISITED |
|---|---|---|---|
| 1 | (SWITCH 1) | 1 | ✔ |
| 2 | (SWITCH 3) | 1 | |
| 3 | (SWITCH 5) | 1 | |

FIG.10A

| DOMAIN | ADDRESS | PARENT DOMAIN | FLAG REPRESENTING WHETHER DOMAIN HAS BEEN VISITED |
|---|---|---|---|
| 1 | (SWITCH 1) | 1 | ✔ |
| 2 | (SWITCH 3) | 1 | ✔ |
| 3 | (SWITCH 5) | 1 | |
| 4 | (SWITCH 7) | 2 | |
| 5 | (SWITCH 9) | 2 | |

FIG.10B

| DOMAIN | ADDRESS | PARENT DOMAIN | FLAG REPRESENTING WHETHER DOMAIN HAS BEEN VISITED |
|---|---|---|---|
| 1 | (SWITCH 1) | 1 | ✔ |
| 2 | (SWITCH 3) | 1 | ✔ |
| 3 | (SWITCH 5) | 1 | ✔ |
| 4 | (SWITCH 7) | 2 | |
| 5 | (SWITCH 9) | 2 | |

FIG.10C

| DOMAIN | ADDRESS | PARENT DOMAIN | FLAG REPRESENTING WHETHER DOMAIN HAS BEEN VISITED |
|---|---|---|---|
| 1 | (SWITCH 1) | 1 | ✔ |
| 2 | (SWITCH 3) | 1 | ✔ |
| 3 | (SWITCH 5) | 1 | ✔ |
| 4 | (SWITCH 7) | 2 | ✔ |
| 5 | (SWITCH 9) | 2 | |
| 5 | (SWITCH 9) | 4 | |

FIG.10D

| DOMAIN | ADDRESS | PARENT DOMAIN | FLAG REPRESENTING WHETHER DOMAIN HAS BEEN VISITED |
|---|---|---|---|
| 1 | (SWITCH 1) | 1 | ✔ |
| 2 | (SWITCH 3) | 1 | ✔ |
| 3 | (SWITCH 5) | 1 | ✔ |
| 4 | (SWITCH 7) | 2 | ✔ |
| 5 | (SWITCH 9) | 2 | |

FIG.10E

| DOMAIN | ADDRESS | PARENT DOMAIN | FLAG REPRESENTING WHETHER DOMAIN HAS BEEN VISITED |
|---|---|---|---|
| 1 | (SWITCH 1) | 1 | ✔ |
| 2 | (SWITCH 3) | 1 | ✔ |
| 3 | (SWITCH 5) | 1 | ✔ |
| 4 | (SWITCH 7) | 2 | ✔ |
| 5 | (SWITCH 9) | 2 | ✔ |
| 4 | (SWITCH 9) | 5 | |

FIG.10F

| DOMAIN | ADDRESS | PARENT DOMAIN | FLAG REPRESENTING WHETHER DOMAIN HAS BEEN VISITED |
|---|---|---|---|
| 1 | (SWITCH 1) | 1 | ✔ |
| 2 | (SWITCH 3) | 1 | ✔ |
| 3 | (SWITCH 5) | 1 | ✔ |
| 4 | (SWITCH 7) | 2 | ✔ |
| 5 | (SWITCH 9) | 2 | ✔ |

| DOMAIN | ADDRESS | PARENT DOMAIN | FLAG REPRESENTING WHETHER DOMAIN HAS BEEN VISITED |
|---|---|---|---|
| 1 | (SWITCH 1) | 1 | ✔ |
| 2 | (SWITCH 3) | 1 | |
| 3 | (SWITCH 5) | 1 | |

FIG.25A

| DOMAIN | ADDRESS | PARENT DOMAIN | FLAG REPRESENTING WHETHER DOMAIN HAS BEEN VISITED |
|---|---|---|---|
| 1 | (SWITCH 1) | 1 | ✔ |
| 2 | (SWITCH 3) | 1 | ✔ |
| 3 | (SWITCH 5) | 1 | |
| 4 | (SWITCH 7) | 2 | |
| 5 | (SWITCH 9) | 2 | |

FIG.25B

| DOMAIN | ADDRESS | PARENT DOMAIN | FLAG REPRESENTING WHETHER DOMAIN HAS BEEN VISITED |
|---|---|---|---|
| 1 | (SWITCH 1) | 1 | ✔ |
| 2 | (SWITCH 3) | 1 | ✔ |
| 3 | (SWITCH 5) | 1 | ✔ |
| 4 | (SWITCH 7) | 2 | |
| 5 | (SWITCH 9) | 2 | |

FIG.25C

| DOMAIN | ADDRESS | PARENT DOMAIN | FLAG REPRESENTING WHETHER DOMAIN HAS BEEN VISITED |
|---|---|---|---|
| 1 | (SWITCH 1) | 1 | ✔ |
| 2 | (SWITCH 3) | 1 | ✔ |
| 3 | (SWITCH 5) | 1 | ✔ |
| 4 | (SWITCH 7) | 2 | ✔ |
| 5 | (SWITCH 9) | 2 | |

FIG.25D

| DOMAIN | ADDRESS | PARENT DOMAIN | FLAG REPRESENTING WHETHER DOMAIN HAS BEEN VISITED |
|---|---|---|---|
| 1 | (SWITCH 1) | 1 | ✔ |
| 2 | (SWITCH 3) | 1 | ✔ |
| 3 | (SWITCH 5) | 1 | ✔ |
| 4 | (SWITCH 7) | 2 | ✔ |
| 5 | (SWITCH 9) | 2 | ✔ |

FIG.25E

SWITCH AND SWITCH SYSTEM FOR ENABLING PATHS BETWEEN DOMAINS

CROSS-REFERENCE TO RELATED APPLICATIONS

This application is based upon and claims the benefit of priority of the prior Japanese Patent Application No. 2013-032097, filed on Feb. 21, 2013, the entire contents of which are incorporated herein by reference.

FIELD

This invention relates to a switch apparatus used in a network.

BACKGROUND

Recently, in a cloud service that is realized in a data center or the like, server resources are shared by a lot of customers. Therefore, demands increase to construct a network for directly connecting with a lot of servers as a duplicated broadband network (or network, which is made redundant), which is made by connecting a lot of switches with plural paths.

Because switches in front of the servers are layer-2 switches, a loop is formed when building the aforementioned network as it is. Therefore, Spanning Tree Protocol (STP) or the like might be used. However, in such a case, the redundant path is blocked and cannot be used. Therefore, the network is not broadband. A switch appears, which is called "Fabric switch", and by which plural same switches are logically integrated, plural connection lines are used as redundant paths by communicating states among the plural same switches, and it is possible to build the duplicated broadband network without using STP. "Fabric" represents a network built by the Fabric switches.

In order to have plural switches logically recognized as one switch, this Fabric switch is desired to have following functions, for example.
(A) Plural paths provided between Fabric switches can be effectively utilized and a loop is avoided.
(B) In order to support a connection (i.e. Link Aggregation (LAG)) in a form that redundancy for outside networks or servers is secured, the Fabric switch supports MLAG (Multi-chassis Link Aggregation. This is a connection in a form that plural lines included in the LAG are connected with different switches.).

(B) can be handled by developing a dedicated relay hardware (e.g. Application Specific Integrated Circuit (ASIC) chip) or using a hardware on the market, which has the MLAG function.

Even when any hardware is employed, state synchronization with hardwares in other switches is performed in order to realize the MLAG function, and the lines between the Fabric switches are not normal lines of Ethernet (Registered Trademark). In other words, the MLAG function is realized by performing communication in a unique format between the Fabric switches through the lines used as internal links. Here, the function for performing communication in the unique format is individually prepared for each hardware, however, in addition to the MLAG function, a function as an internal function is provided in almost all cases to avoid a loop in case where the loop is built with internal connection lines between the hardwares. Therefore, (A) can be resolved by utilizing such a function. However, this solution depends on the internal specification provided by a vendor of the hardware, and the aforementioned function is utilized in a different purpose. Therefore, when an unfavorable result is obtained, correction or change may be difficult.

In addition, in order to realize (A), Transparents Interconnection of Lots of Links (TRILL: RFC5556), Shortest Path Bridge (SPB: IEEE802.1aq) and the like exist presently. Therefore, plural paths can be efficiently utilized by using those techniques. However, when MLAG is realized by the aforementioned hardware, a mechanism for connecting the switches in a unique format is utilized unavoidably, however, it is known that an affinity of such a mechanism with TRILL or SPB is bad.

Moreover, TRILL and SPB add a MAC (Media Access Control) header to an input frame, and control the communication paths by converting the added MAC address Hop by Hop. Because the MAC header is added to the internally relayed frame, an overhead that is longer than 20 Bytes is attached to the input frame received from the outside, and the bandwidth when transferring a short frame (e.g. 64 bytes) is largely reduced. This is because the ratio of the overhead length is great compared with the frame length.

Thus, there is no technique for enabling plural paths provided between first switches and second switches to be effectively utilized.

Patent Document 1: Japanese National Publication of International Patent Application No. 2005-522774

Patent Document 2: Japanese Laid-open Patent Publication No. 11-103302

SUMMARY

A switch relating to this invention includes: (A) ports that include a first port to be connected to another switch included in a first domain that includes plural switches to be virtually integrated, and a second port that is other than the first port; (B) a first processing unit configured to obtain data of a switch included in the first domain through the first port; and (C) a second processing unit configured to obtain data of switches included in a second domain that is adjacent to the first domain through the second port and obtain data of switches included in the second domain from the another switch included in the first domain to identify, from among the ports, plural ports that are connected to the second domain, perform a setting for the identified plural ports, and perform a first processing to make plural domains that include the first and second domains a tree structure.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 10A is a diagram depicting a first state of a list of connection destination domains;

FIG. 10B is a diagram depicting a second state of the list of the connection destination domains;

FIG. 10C is a diagram depicting a third state of the list of the connection destination domains;

FIG. 10D is a diagram depicting a fourth state of the list of the connection destination domains;

FIG. 10E is a diagram depicting a fifth state of the list of the connection destination domains;

FIG. 10F is a diagram depicting a sixth state of the list of the connection destination domains;

FIG. 25A is a diagram depicting a first state of a list of connection destination domains in the third embodiment;

FIG. 25B is a diagram depicting a second state of the list of the connection destination domains in the third embodiment;

FIG. 25C is a diagram depicting a third state of the list of the connection destination domains in the third embodiment;

FIG. 25D is a diagram depicting a fourth state of the list of the connection destination domains in the third embodiment;

FIG. 25E is a diagram depicting a fifth state of the list of the connection destination domains in the third embodiment;

DESCRIPTION OF EMBODIMENTS

Embodiment 1

Figure 1:
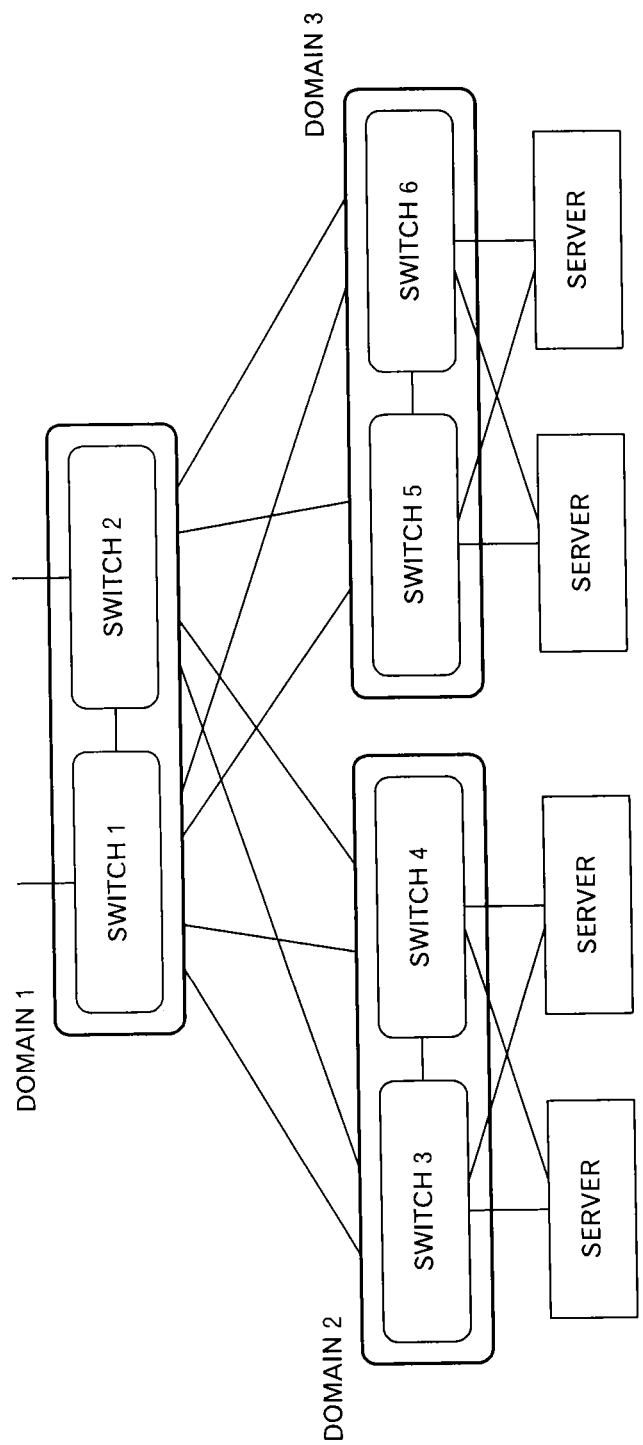
FIG. 1 is a diagram depicting a configuration example of Fabric.

FIG. 1 illustrates a configuration example of the Fabric relating to this embodiment. FIG. 1 illustrates one Fabric including 6 switches.

In this embodiment, as a first-stage virtual integration, switches to be virtually integrated firstly are connected in a unique format by using the function provided in advance in the hardware of the switches to perform the integration for having the switches recognized as one switch. Accordingly, it becomes possible to realize the MLAG function in the switches connected as described above by the hardware provided in advance in the switches. One set of switches that have been integrated as described above is called a domain. In an example of FIG. 1, a domain 1 including switches 1 and 2, a domain 2 including switches 3 and 4 and a domain 3 including 5 and 6 are built.

After that, as second-stage virtual integration, a tree structure is formed, which has a certain domain as the summit (i.e. root) among the domains. In the example of FIG. 1, the domain 1 is a root domain, and the domains 2 and 3 are leaf domains. The leaf domains are connected to the servers and storages.

When the tree structure of the domains is built as described above, a path control method for effectively and efficiently utilizing plural paths provided between the domains is applied only to paths between one domain and another domain, each of which is virtually integrated to one switch. Therefore, the path control method does not depend on a special specification of the switch hardware and can be realized simply and efficiently.

Figure 2:
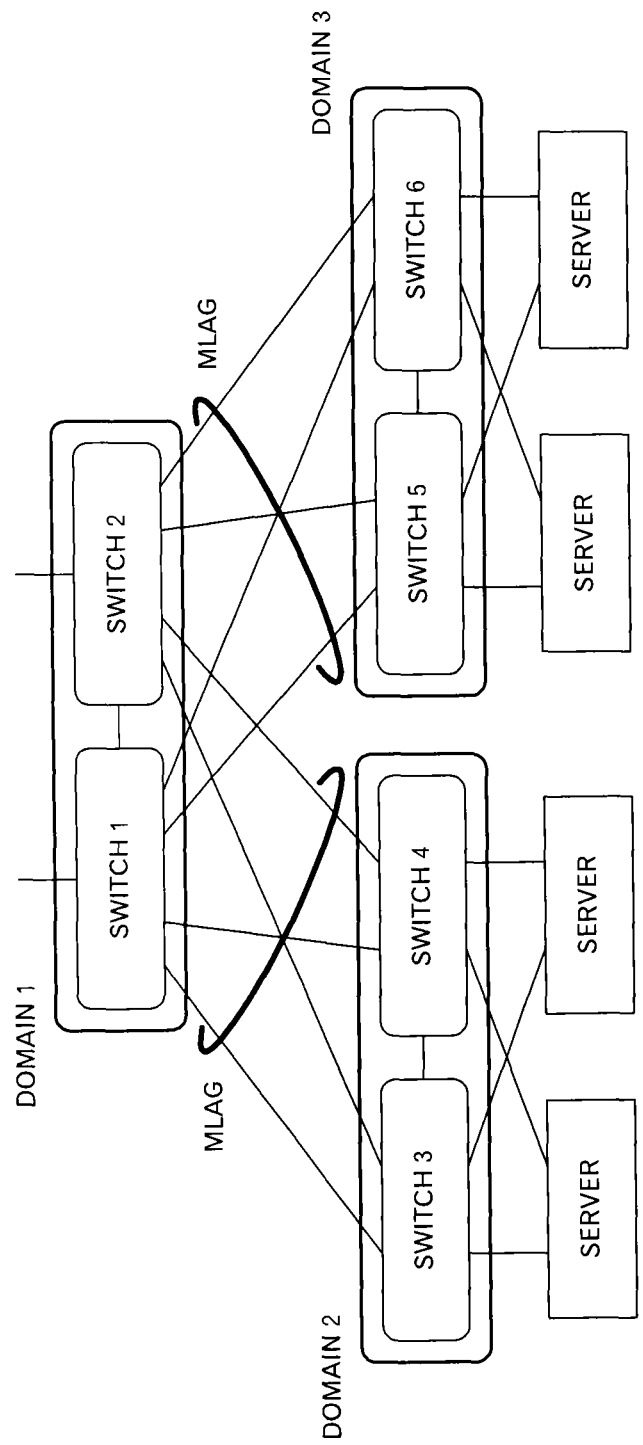
FIG. 2 is a diagram to explain MLAG.

In this embodiment, as the path control method, MLAG is utilized. As illustrated in FIG. 2, by setting all of plural paths between two domains as the same MLAG member, the plural paths between two domains are logically used as one line, and as the entire Fabric, a single tree structure that logically has one root domain as the summit is obtained.

Figure 3:
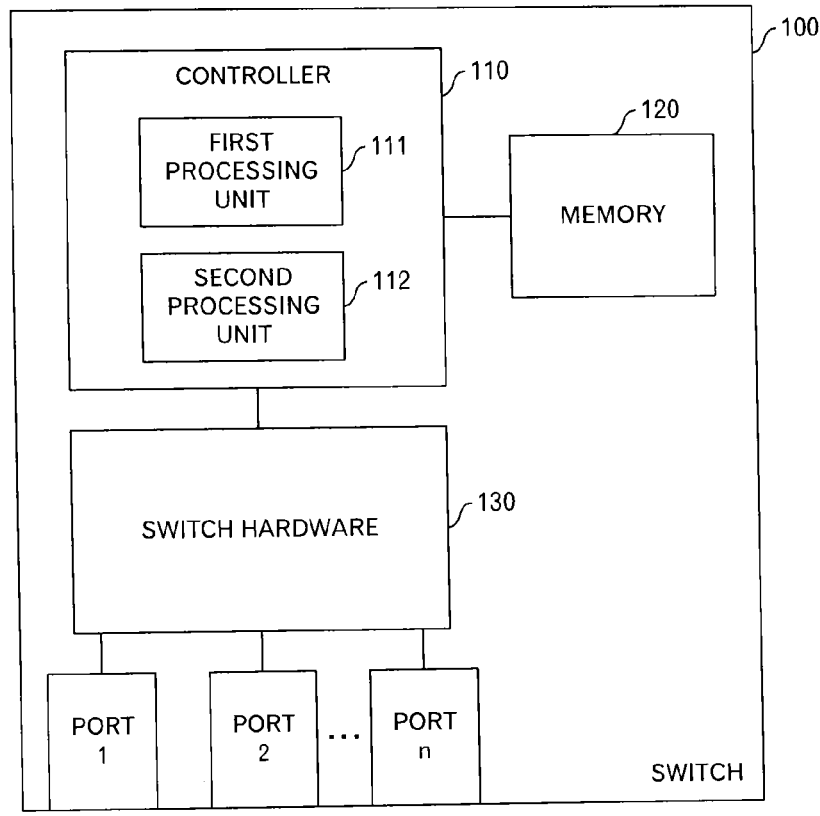
FIG. 3 is a functional block diagram of a switch.

Each switch in this embodiment has a configuration as illustrated in FIG. 3. A switch 100 has a controller 110, a memory 120, a switch hardware 130 and ports 1 to n. The controller 110 controls the entire switch 100 including the switch hardware 130, and has a first processing unit 111 that performs a domain building processing relating to this embodiment, and a second processing unit 112 that performs a Fabric building processing including a processing to build the tree structure. The controller 110 is realized, for example, by a combination of a processor and programs. In such a case, by executing programs that are stored in the memory 120 or other Read Only Memory (ROM) by the processor, the controller 110 is realized. The memory 120 stores data collected by the controller 110 and the like.

The switch hardware 130 has a function to communicate with other switches in a unique format and the MLAG function, and is a semiconductor device that performs frame relay between ports. Cables for connecting with other switches, outside networks, servers and the like are connected to the ports 1 to n. The MLAG function is a function to handle plural specific links in the plural switches as one link.

Next, processing contents executed by the switch 100 relating to this embodiment will be explained by using FIGS. 4 to 10G.

Figure 4:
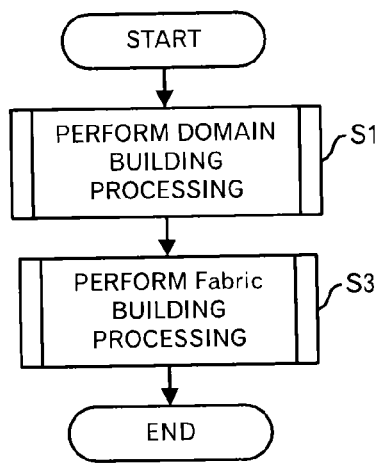
FIG. 4 is a diagram depicting a main processing flow relating to an embodiment.

The first processing unit 111 in the controller 110 of the switch 100 performs the domain building processing that corresponds to the first stage of the aforementioned first virtual integration (FIG. 4: step S1). The domain building processing will be explained in detail later. After that, the second processing unit 112 in the controller 110 performs the aforementioned Fabric building processing (step S3). The Fabric building processing will also be explained in detail later.

By performing the aforementioned two-stage processing, the building of the Fabric can be simply and efficiently performed.

Next, processing contents of the domain building processing will be explained by using FIG. 5. An administrator previously sets definition data including a domain number, switch number (unique number in the Fabric), port number for intra-domain link (links connected to switches to be included in the same domain), information representing whether or not its own domain is the root domain to each switch.

Figure 5:
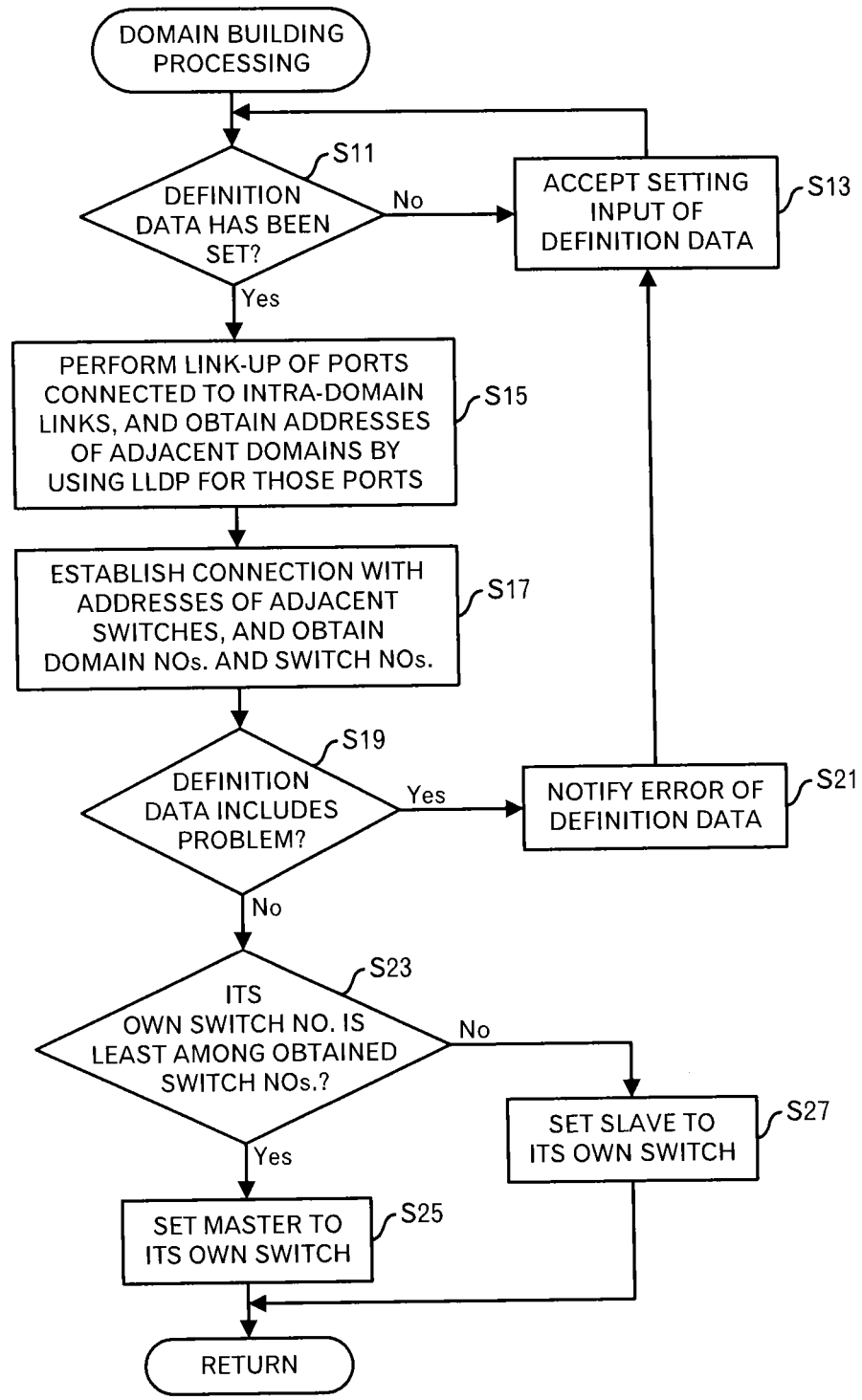
FIG. 5 is a diagram depicting a processing flow of a domain building processing relating to a first embodiment.

Then, the first processing unit 111 determines whether or not the definition data has been set in the memory 120, for example (FIG. 5: step S11). When the definition data has not been set, the first processing unit 111 waits for setting input of the definition data from the administrator, and stores the input data into the memory 120 when it is inputted (step S13). Then, the processing returns to the step S11.

On the other hand, when the definition data has been set, the first processing unit 111 causes the switch hardware 130 to perform link-up of a port for the intra-domain link and obtains an address of an adjacent switch by using Link Layer Discovery Protocol (LLDP) for that port (step S15). Furthermore, the first processing unit 111 causes the switch hardware 130 to perform connection to the address of the adjacent switch, and obtains the domain number and switch number of the adjacent switch, and the domain numbers and switch numbers of further adjacent switches to the adjacent switch (step S17). The addresses of the adjacent switch and further adjacent switch are also obtained. The domain number, the switch number and the like of its own switch are notified to the adjacent switch. As a result, the domain numbers, switch numbers and the like for all switches included in its own domain are collected. This processing is performed by data exchange in the unique format to the switch hardware 130.

Then, the first processing unit 111 determines whether or not the setting of the definition data has a problem (step S19). Specifically, when switches that have different domain numbers exist or when switches that have the same switch number exist, it is determined that the definition data has a problem. The subsequent processing is performed based on the domain numbers and switch numbers, so it is checked at this timing whether or not the definition is correctly performed.

When the setting of the definition data has a problem, the first processing unit 111 outputs an error of the definition data to the administrator (step S21), and the processing returns to the step S13. For example, when the switch number of the switch that has a different domain number or the same switch number is detected, such a number is notified, and correction is requested for the administrator.

On the other hand, when the setting of the definition data has no problem, the first processing unit 111 determines whether or not its own switch number is the least among the obtained switch numbers (step S23). Here, when its own switch number is the least, the first processing unit 111 sets its own switch as a master (step S25). Then, the processing returns to a calling-source processing. On the other hand, when its own switch number is not the least, the first processing unit 111 sets its own switch as a slave (step S27). Then, the processing returns to the calling-source processing. In this embodiment, the condition of the master switch is that its own switch number is the least, however, the master may be set based on another condition.

Each domain is built by performing the aforementioned processing.

Next, the Fabric building processing relating to this embodiment will be explained by using FIGS. 6 to 10G.

Figure 6:
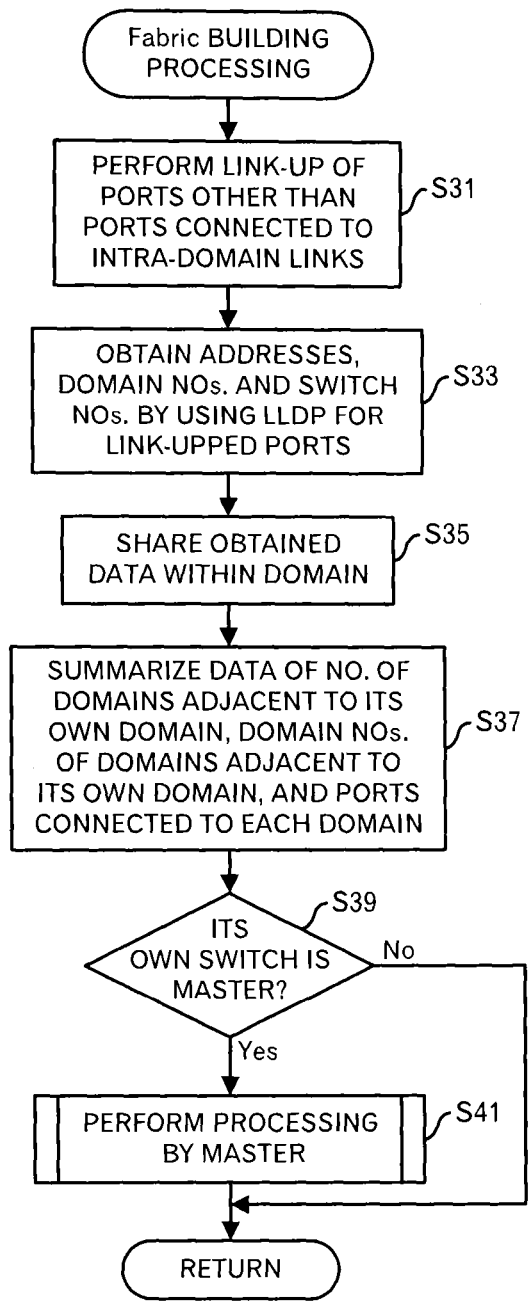
FIG. 6 is a diagram depicting a processing flow of a Fabric building processing relating to the first embodiment.

The second processing unit 112 causes the switch hardware 130 to perform link-up of ports other than the intra-domain link (FIG. 6: step S31). After that, the second processing unit 112 obtains addresses, domain numbers, switch numbers and the like of the adjacent switches by using LLDP for those ports for which the link-up was performed (step S33). Specifically, when the addresses are obtained, connections are made through the switch hardware 130 and appropriate ports with the obtained addresses, and the domain numbers and switch numbers are obtained.

After that, the second processing unit 112 shares the obtained data through the intra-domain link with other switches in the same domain (step S35). Then, the second processing unit 112 summarizes data of the number of domains that are adjacent to its own domain, domain numbers of the domain that are adjacent to its own domain, and data of ports connected to each adjacent domain, and stores the summarized data into the memory 120 (step S37). By this step, data (addresses, domain numbers, switch numbers and port numbers) of the adjacent switches connected to each port of all switches in the domain is stored. Furthermore, a list of the adjacent domain numbers, and data representing, for each adjacent domain, which combination of the switch and port is connected to the adjacent domain, are generated.

Then, the second processing unit 112 determines whether or not its own switch is the master switch (step S39), and when its own switch is the master switch, the second processing unit 112 performs a processing by the master (step S41). The processing by the master will be explained in detail later. On the other hand, when its own switch is not the master switch, the processing returns to the calling-source processing. Even when its own switch is not the master switch and is the slave switch, a processing is performed in response to an instruction by the processing by the master.

Figure 7:
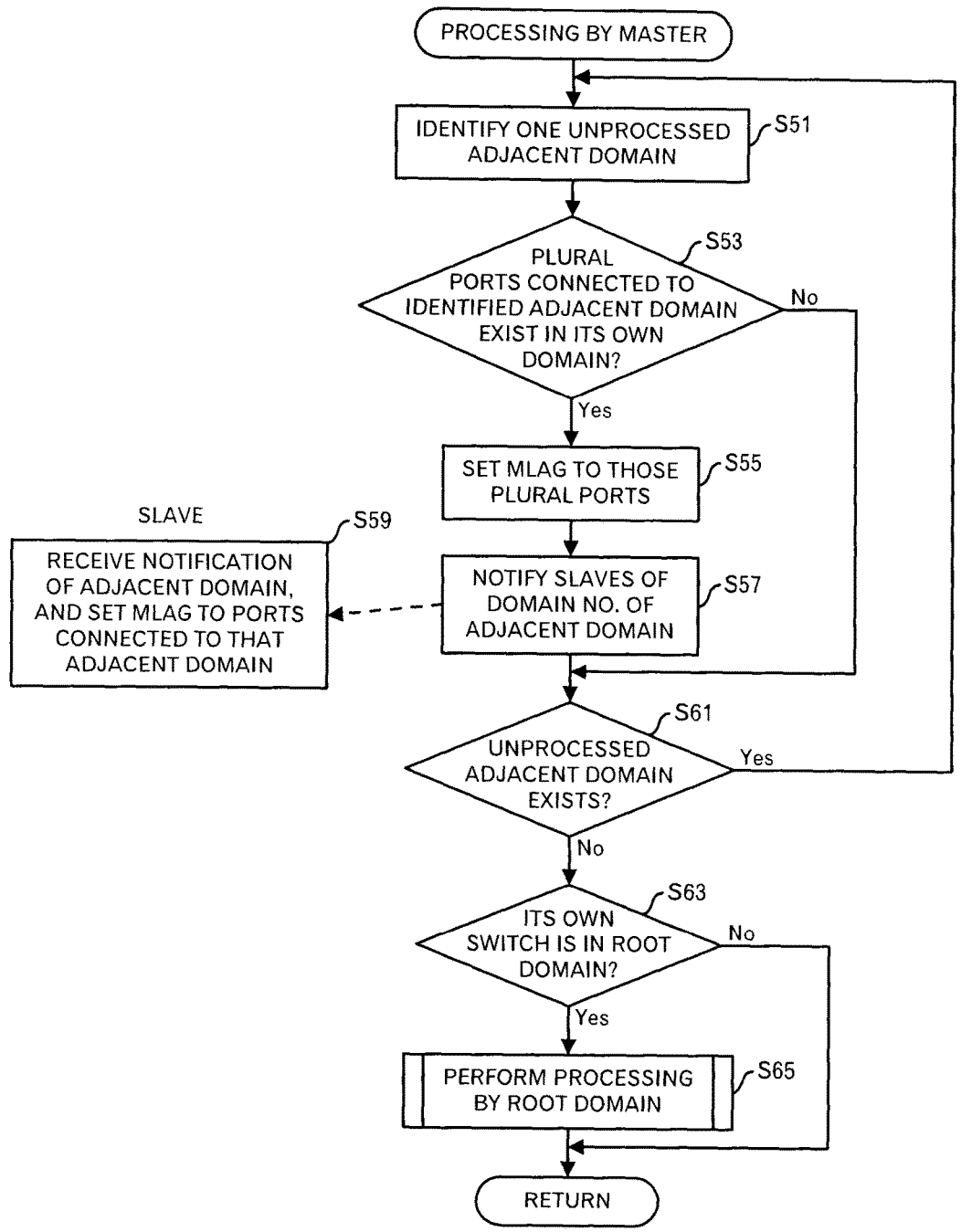
FIG. 7 is a diagram depicting a processing flow of a processing by a master, which relates to the first embodiment.

Next, the processing by the master will be explained by using FIGS. 7 to 10G. In each domain, the second processing unit 112 of the controller 110 in the master switch identifies one unprocessed adjacent domain in the list of the adjacent domain numbers, which is stored in the memory 120 (FIG. 7: step S51). Then, the second processing unit 112 determines, based on the data stored in the memory 120, whether or not plural ports connected to the identified adjacent domain exist in its domain (step S53). This is determined from data representing, for each adjacent domain, which combination of the switch and port is connected to the adjacent domain, whether or not plural ports are identified for the identified adjacent domain.

Then, when plural ports connected to the identified adjacent domain do not exist in its own domain, the processing shifts to step S61. On the other hand, when plural ports connected to the identified adjacent domain exist in its own domain, the second processing unit 112 sets MLAG to those plural ports (step S55). Namely, when the master switch includes any one of those plural ports, the second processing unit 112 causes the switch hardware 130 to set MLAG to the port or ports included in its own switch. When those plural ports include any port of the slave switches in its own domain, the second processing unit 112 notifies the applicable slave switch of the domain number of the identified adjacent domain through the intra-domain link (step S57). When the second processing unit 112 of the slave switch receives the notification of the domain number of the identified adjacent domain from the master switch, the second processing unit 112 causes the switch hardware 130 of its own switch to set MLAG to the port connected to the domain of the notified domain number (step S59).

Accordingly, inter-domain links are set as one MLAG port, and in this embodiment, it becomes possible to use the plural links distributedly.

Then, the second processing unit 112 in the master switch determines, in the list of the adjacent domain numbers, whether or not there is an unprocessed adjacent domain (step S61). When there is an unprocessed adjacent domain, the processing returns to the step S51. On the other hand, when there is no unprocessed adjacent domain, the second processing unit 112 determines whether or not its own switch is the master switch in the root domain (step S63). When its own switch is not the master switch in the root domain, the processing returns to the calling-source processing.

On the other hand, when its own switch is the master switch in the root domain, the second processing unit 112 performs a processing by the root domain (step S65). The processing by the root domain will be explained by using FIGS. 8 to 10G.

Figure 8:
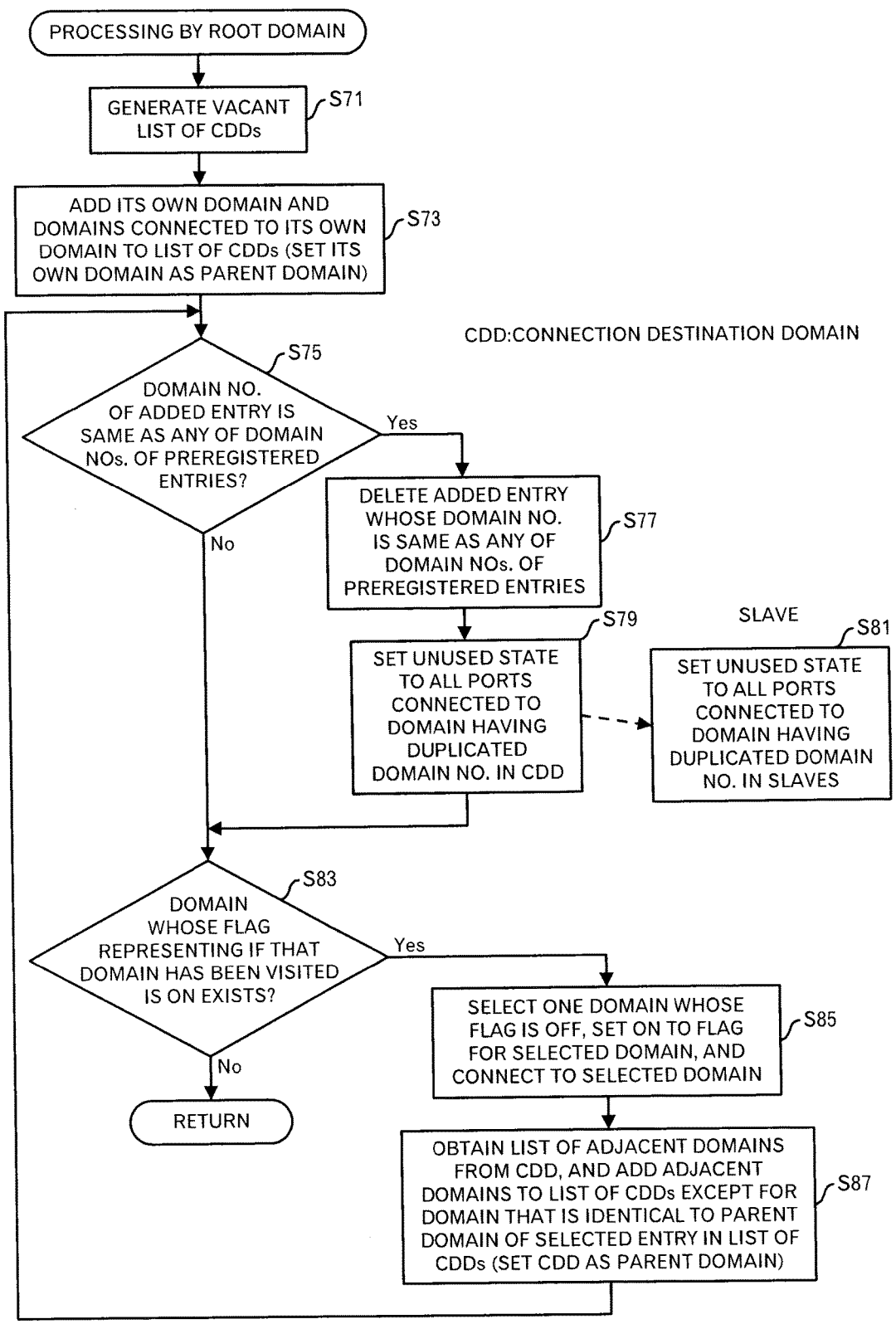
FIG. 8 is a diagram depicting a processing flow of a processing by a root domain, which relates to the first embodiment.

The second processing unit 112 of the controller 110 in the root domain generates a vacant list of connection destination domains, for example, in the memory 120 (FIG. 8: step S71). Then, the second processing unit 112 adds its own domain (root domain) and domains connected to its own domain to the list of the connection destination domains, and sets its own domain (i.e. root domain) as a parent domain (step S73).

Figure 9:
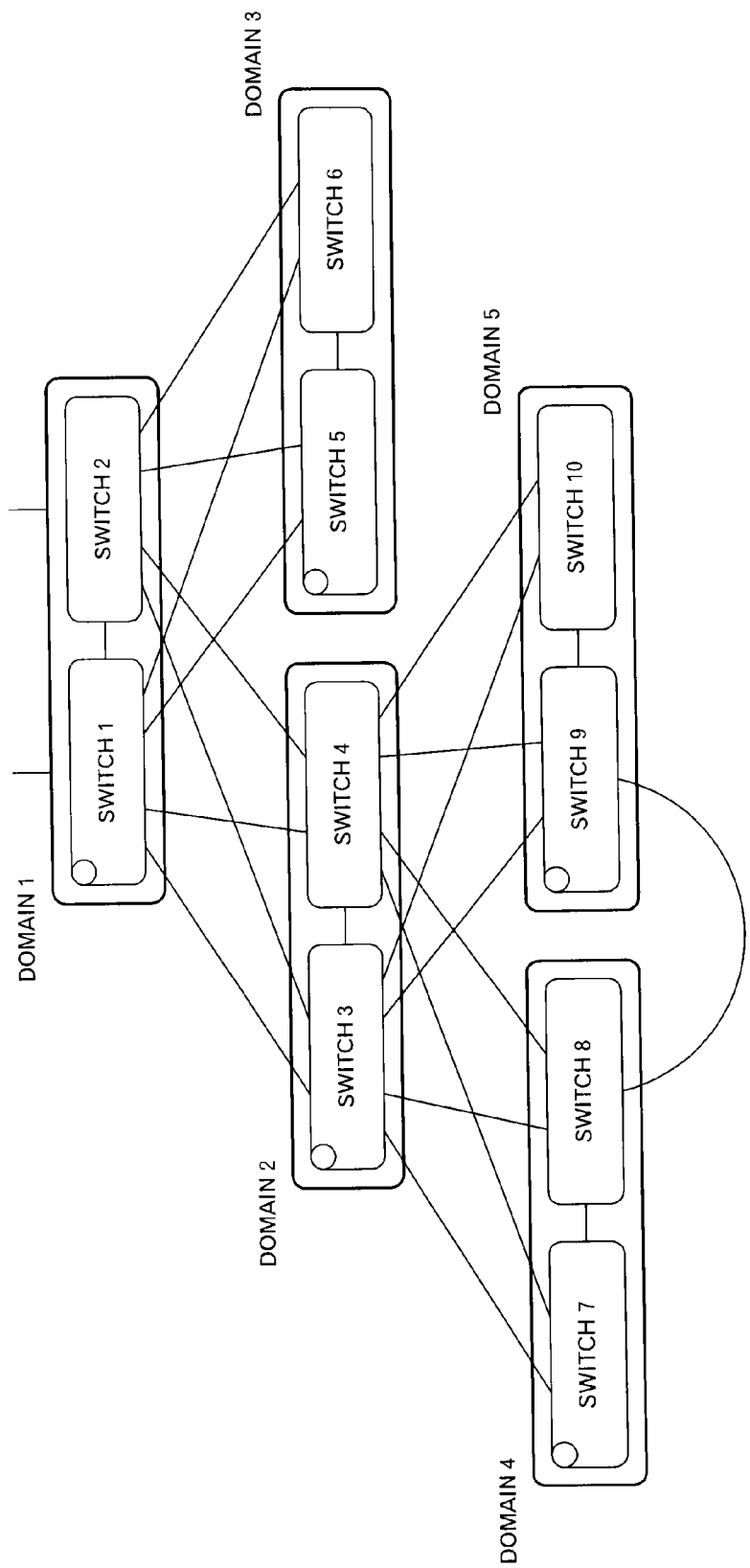
FIG. 9 is a diagram depicting a connection example of the switches.

For example, an example will be explained, in which connections as illustrated in FIG. 9 are established. In the example of FIG. 9, switches 1 and 2 are included in domain 1, switches 3 and 4 are included in domain 2, switches 5 and 6 are included in domain 3, switches 7 and 8 are included in domain 4, and switches 9 and 10 are included in domain 5. The switches 1, 3, 5, 7 and 9 are the master switches. Then, the domain 1 is the root domain, and connected to the domains 2 and 3. The domains 4 and 5 are connected to the domain 2. Because the domains 4 and 5 are connected, the tree structure is not made according to this physical connection.

Moreover, at the step S73, the list of the connection destination domains as illustrated in FIG. 10A is generated. In an example of FIG. 10A, a domain number, address of the master switch of that domain, parent domain and flag representing whether or not that domain has been visited are stored for each domain. At the step S73, the flag is set for the domain 1 that is the root domain, however, the flag is not set for other domains. Moreover, as the parent domain of the domains 1 to 3, the domain 1 is set.

Then, the second processing unit 112 determines whether or not the domain number of an added entry is identical to any one of the domain numbers of previously registered entries (step S75). In the case in FIG. 10A, it is determined that the domain number of the added entry is not identical. When it is determined that the domain number of the added entry is not identical, the second processing unit 112 determines whether or not the there is a domain whose flag is not set in the list of the connection destination domains (step S83). When there is no domain whose flag is not set, the processing returns to the calling-source processing.

On the other hand, when there is a domain whose flag is not set, the second processing unit 112 selects one domain whose flag is not set in the list of the connection destination domains, sets ON to the flag, and connects to the master switch in the selected domain (step S85). The second processing unit 112 connects with the master switch of the target domain through an appropriate port and the switch hardware 130. At this time, the connection with the master switch of the target domain is established through a shortest path from the root domain.

Furthermore, the second processing unit 112 obtains a list of adjacent domains from the connection destination domain, and adds the adjacent domains other than the same domain as the parent domain of the selected entry in the list of the connection destination domains to the list of the connection destination domains (step S87). At this time, the parent domain of the adjacent domains to be added is set as the connection destination domain. Then, the processing returns to the step S75.

After the state illustrated in FIG. 10A, when connecting with the domain 2, ON is set to the flag for the domain 2. Furthermore, a list of the adjacent domains (domains 1, 4 and 5) is obtained from the domain 2, and the adjacent domains other than the same domain as the parent domain (here, the root domain) of the connection destination domain (domain 2) are added to the list of the connection destination domains. Then, a state as illustrated in FIG. 10B is obtained. The parent domain of the added entry is the domain 2.

Even when the processing returns to the step S75, there is no duplicate domain number in the list of the connection destination domains. Therefore, the steps S85 and S87 are performed. Then, when connecting to the domain 3, ON is set to the flag for the domain 3. Furthermore, a list of the adjacent domains is obtained from the domain 3. Because there is no new adjacent domain except for the parent domain of the connection destination domain, a state illustrated in FIG. 10C is obtained.

Even when the processing returns to the step S75, there is no duplicate domain number in the list of the connection destination domains. Therefore, the steps S85 and S87 are performed. Then, when connecting to the domain 4, ON is set for the flag for the domain 4. Furthermore, the list of the adjacent domains (domains 2 and 5) is obtained from the domain 4, however, when excluding the parent domain of the connection destination domain, the domain 5 is added to the list of the connection destination domains. Here, the list of the connection destination domains is as illustrated in FIG. 10D. The parent domain of the added entry is the domain 4. Then, the domain number "5" is duplicated.

When the domain number of the added entry is identical to any of the domain numbers of the previously registered entries, the second processing unit 112 deletes, from the list of the connection destination domains, the added entry whose domain number is identical to any of the domain numbers of the previously registered entries (step S77). Then, the second processing unit 112 sets a unused state (blocking state) to all ports connected to the domain whose domain number is the duplicated domain number in the connection destination domain (step S79). More specifically, because connection with the master switch of the connection destination domain is established, when the port of the master switch is connected to the applicable domain (i.e. the domain whose domain number is the duplicated domain number), the second processing unit 112 causes the switch hardware 130 of the master switch to set the unused state to the port connected to the applicable domain. Moreover, when the port of the slave switch is connected to the applicable domain, the second processing unit 112 causes the switch hardware 130 of the slave switch to set the unused state to the port connected to the applicable domain (i.e. the domain whose domain number is the duplicated domain number) through the intra-domain link (step S81). Then, the processing shifts to step S83.

In a state of FIG. 10D, when the duplication of the domain number is detected, the domain number "5" is deleted (FIG. 10E). As understood from FIG. 9, the domains 4 and 5 are connected. Therefore, in order to build the tree structure, the unused state is set to the port connected to the domain 5 among ports of the switch 8 included in the domain 4.

After that, connection with the domain 5 is established through the domain 2, and ON is set to the flag for the domain 5. Furthermore, the list of the adjacent domains (domains 2 and 4) is obtained from the domain 5, however, the domain 4 is added to the list of the connection destination domains except for the parent domain of the connection destination domains. Then, the list of the connection destination domains is as illustrated in FIG. 10F. The parent domain is the domain 5. Namely, the domain number "4" is duplicate.

Figures 10G, 12:
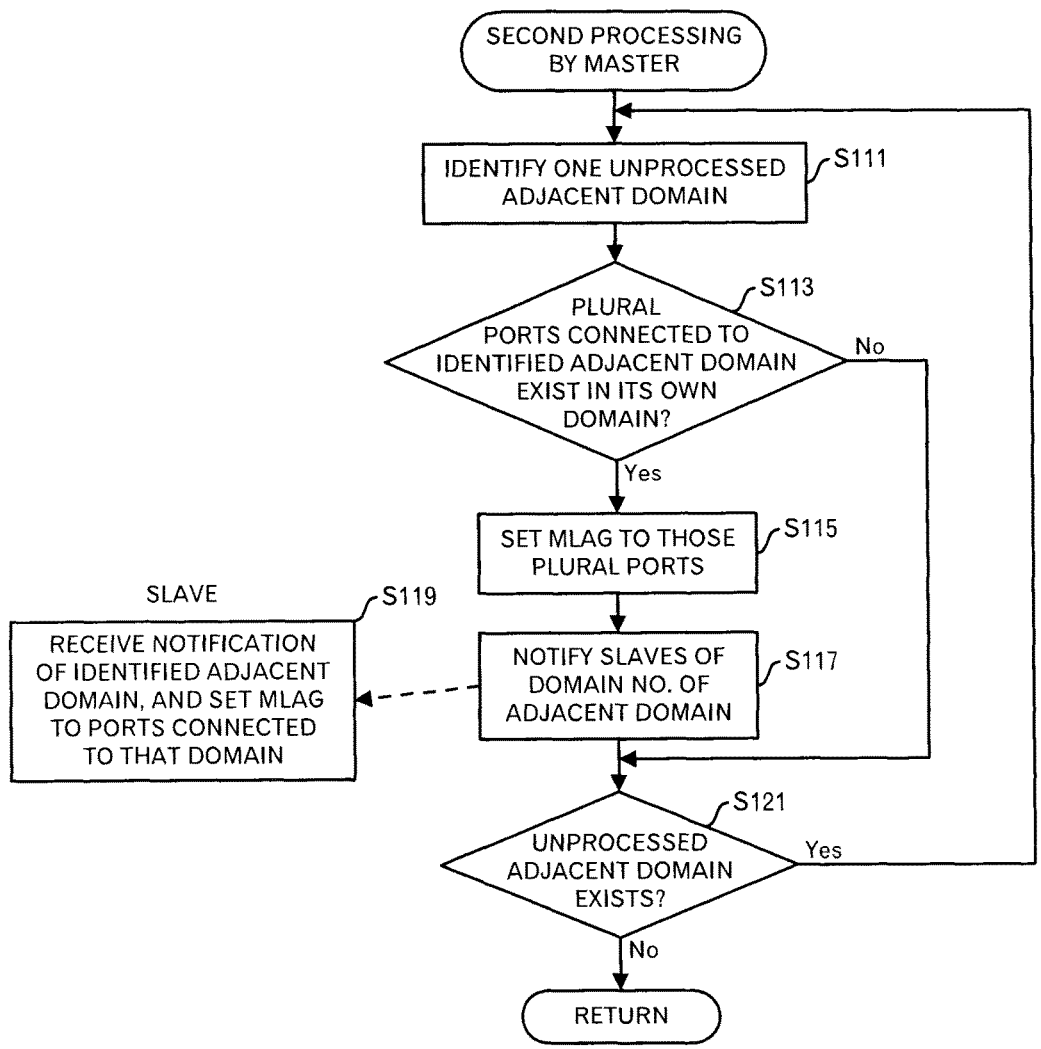
FIG. 10G is a diagram depicting a seventh state of the list of the connection destination domains.
FIG. 12 is a diagram depicting a processing flow of a processing by a master, which relates to the second embodiment.

Then, the duplication of the domain number is detected, so the domain number "4" is deleted (FIG. 10G). As understood from FIG. 9, the domains 4 and 5 are connected. Therefore, the unused state is set to the port connected to the domain 4 among ports of the switch 9 included in the domain 5. In FIG. 10G, ON is set to the flags for all of the domains, so the processing ends.

By performing the aforementioned processing, the tree structure is completely made. Moreover, when plural links between domains exist, MLAG is set to the plural links, and the MLAG function that the switch hardware 130 has is effectively utilized.

Embodiment 2

In the first embodiment, the master switch of the root domain performs the last portion of the Fabric building processing. However, for example, a processing may be performed while exchanging messages among switches.

In the following, processing contents in this embodiment will be explained later, however, the domain building processing is the same as that in the first embodiment, and its explanation is omitted.

The Fabric building processing relating to this embodiment will be explained by using FIGS. 11 to 19.

Figure 11:
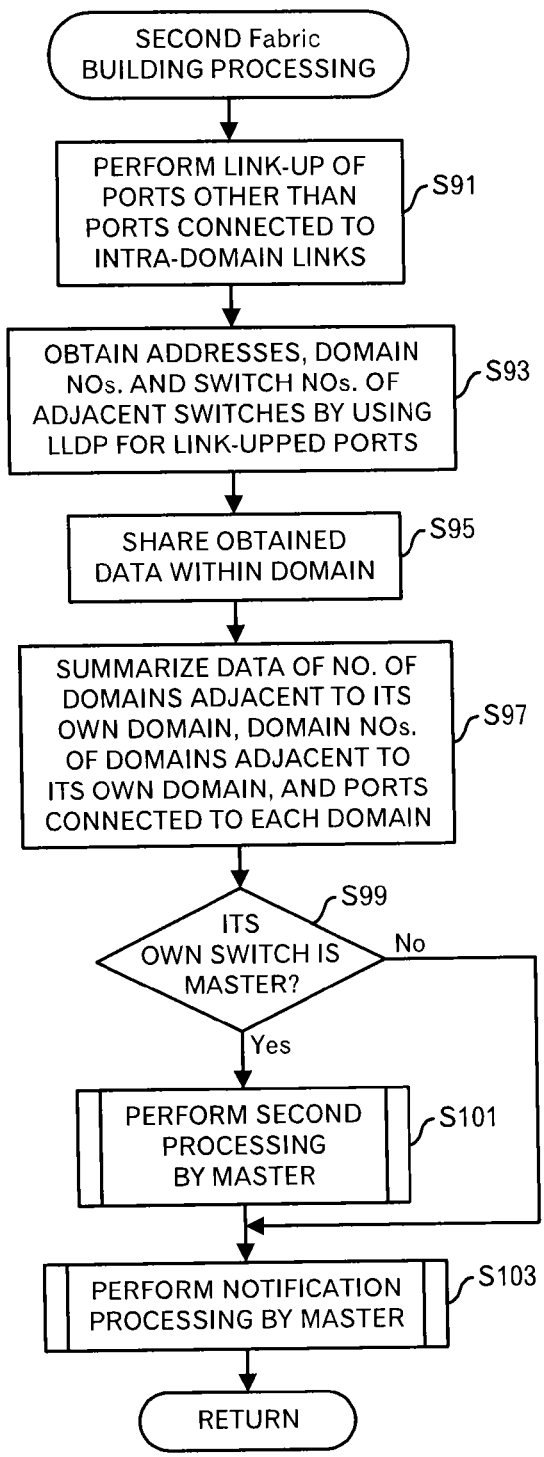
FIG. 11 is a diagram depicting a processing flow of the Fabric building processing relating to a second embodiment.

The second processing unit 112 causes the switch hardware 130 to perform link-up of ports other than the ports connected to the intra-domain links (FIG. 11: step S91). After that, the second processing unit 112 causes the switch hardware 130 to obtain addresses, domain numbers, switch numbers and the like of the adjacent switches by using the LLDP for the link-upped ports (step S93). Specifically, when the address is obtained, connection is established by using the address through the switch hardware 130 and appropriate port, and the domain number, switch number and the like are obtained.

After that, the second processing unit 112 shares the data obtained through the intra-domain links with the other switches in the same domain (step S95). Then, the second processing unit 112 summarizes data of the number of domains that are adjacent to its own domain, domain numbers of the domains that are adjacent to its own domain, and ports connected to each adjacent domain, and stores the summarized data into the memory 120 (step S97). Accordingly, data of the adjacent switch connected to each port of all switches in the domain (address, domain number, switch number and port number) is stored. Furthermore, a list of adjacent domain numbers, and data representing, for each adjacent domain, which combination of the switch and port is connected to the adjacent domain are also generated.

Then, the second processing unit 112 determines whether or not its own switch is the master switch (step S99), and when its own switch is the master switch, the second processing unit 112 performs a second processing by the master (step S101). The second processing by the master in this embodiment will be explained in detail later. After that the processing shifts to step S103.

Moreover, after the step S101 or when its own switch is not the master switch, the second processing unit 112 performs a notification processing (step S103). The notification processing will be explained later in detail. Then, the processing returns to the calling-source processing.

Thus, the steps S91 to S97 are the same as the steps S31 to S37 in the first embodiment.

Next, the second processing by the master will be explained by using FIG. 12. The second processing unit 112 of the controller 110 in the master switch of each domain identifies one unprocessed adjacent domain in the list of the adjacent domain numbers, which is stored in the memory 120 (FIG. 12: step S111). Then, the second processing unit 112 determines whether or not plural ports connected to the identified adjacent domain exist in its own domain, based on data stored in the memory 120 (step S113). Whether or not plural ports are identified for the identified adjacent domain is determined from data representing which combination of the switch and port is connected to the adjacent domain, for each adjacent domain.

Then, when plural ports connected to the adjacent domain do not exist in its own domain, the processing shifts to step S121. On the other hand, when the plural ports connected to the adjacent domain exist in its own domain, the second processing unit 112 sets MLAG to those plural ports (step S115). When those plural ports are included in the master switch, the second processing unit 112 causes the switch hardware 130 to set MLAG to those plural ports. When those plural ports include any port of the slave switch in its own domain, the second processing unit 112 notifies the slave switch of the identified adjacent domain through the intra-domain links (step S117). When the second processing unit 112 in the slave switch receives the notification of the identified adjacent domain from the master switch, the second processing unit 112 causes the switch hardware 130 in its own switch to set MLAG to the ports connected to the identified adjacent domain (step S119).

As a result, the inter-domain links are set as one MLAG link, and it is possible to use the plural links distributedly.

Then, the second processing unit 112 in the master switch determines whether or not there is an unprocessed adjacent domain in the list of the adjacent domain numbers (step S121). When there is an unprocessed adjacent domain, the processing returns to the step S111. On the other hand, when there is no unprocessed adjacent domain, the processing returns to the calling-source processing.

Thus, the processing similar to the steps S51 to S61 relating to the first embodiment are performed.

Next, the notification processing relating to this embodiment will be explained by using FIGS. 13 to 19. As described above, because the layer of its own domain and tree structure are checked by exchanging messages each other among the switches, a transmission process (notification processing A) and a receiving process (notification processing B) of the messages are simultaneously executed on each switch.

The parent domain is a domain to be presently handled as a parent of its own domain, and the layer level of its own switch represents the layer level in case where the layer level of the root domain is "1". For example, the layer level of the certain domain immediately under the root domain is "2", and the layer level of the domain immediately under the certain domain is "3". Moreover, a notification flag used in the following explanation is information shared by the receiving process and the transmission process, and when the layer level is changed by the receiving process and notification about the change of the layer level is made, the notification flag is used as a flag to prompt the transmission process to perform the notification.

Figure 13:
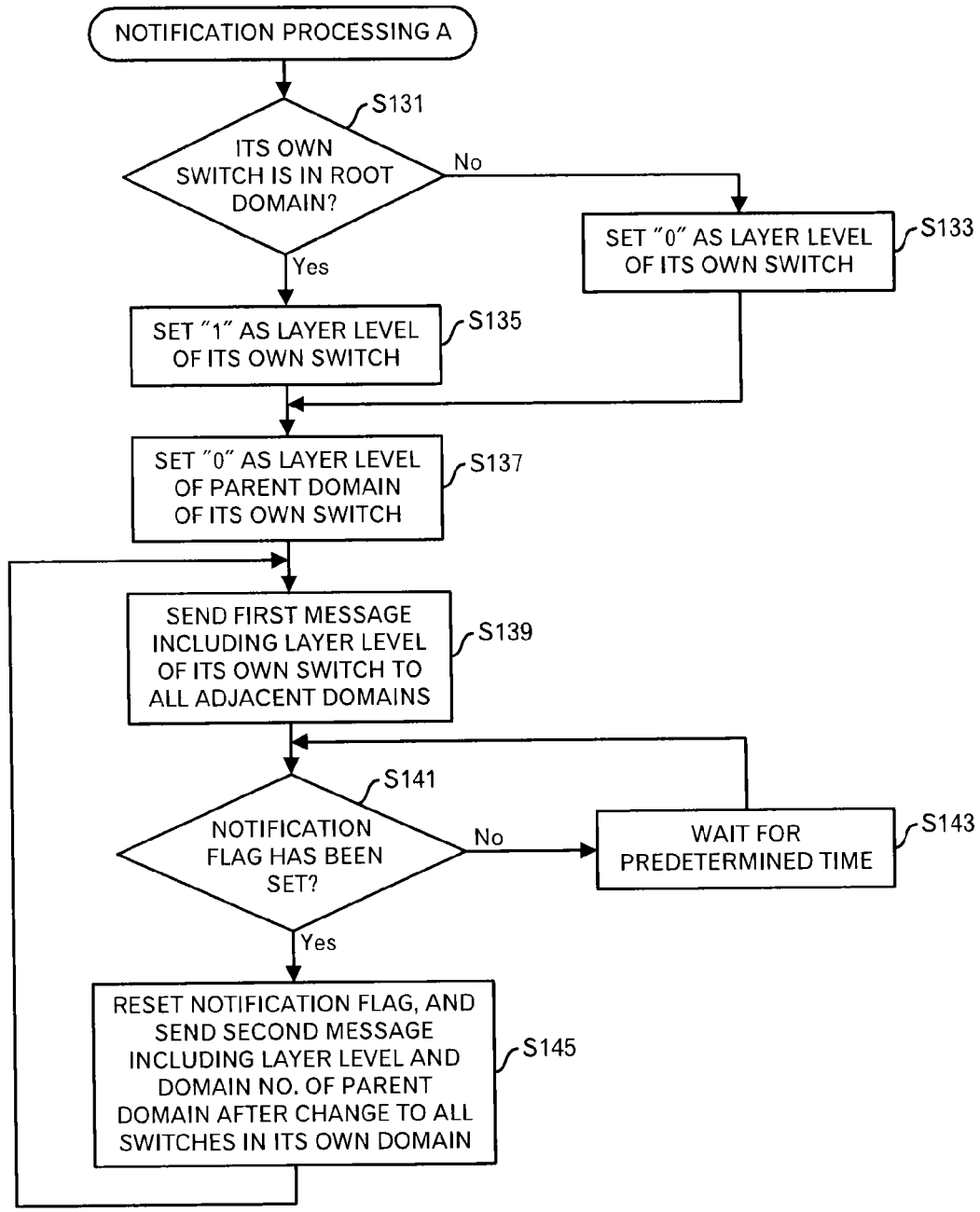
FIG. 13 is a diagram depicting a processing flow of a notification processing A relating to the second embodiment.
Figure 14:
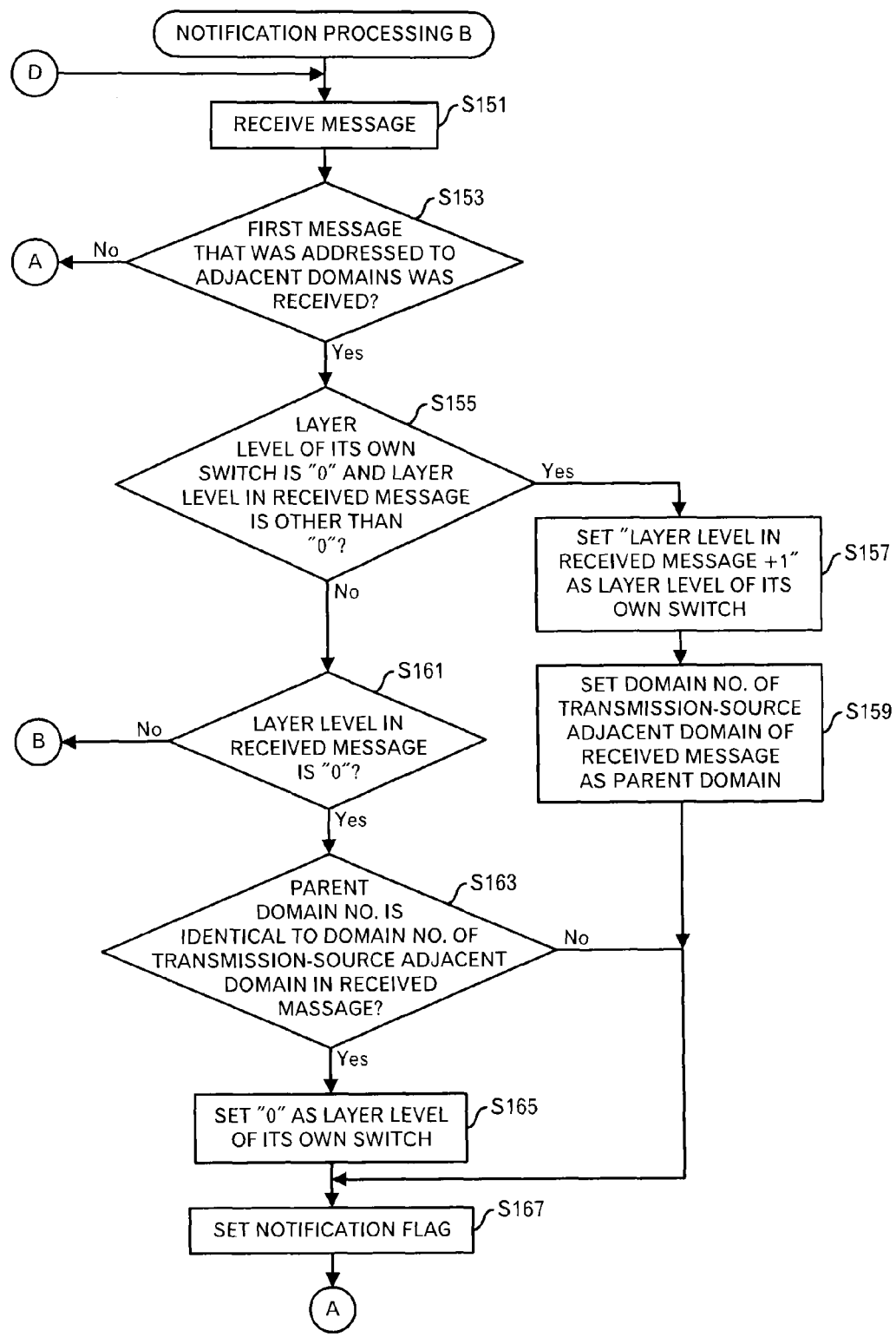
FIG. 14 is a diagram depicting a processing flow of a notification processing B relating to the second embodiment.

First, the second processing unit 112 of the controller 110 in the switch 100 determines whether or not its own switch belongs to the root domain (FIG. 13: step S131). When its own switch does not belong to the root domain, the second processing unit 112 sets "0" as the layer level of its own switch (step S133), and the processing shifts to step S137. On the other hand, when its own switch belongs to the root domain, the second processing unit 112 sets "1" as the layer level of its own switch (step S135).

Then, the second processing unit 112 sets "0" as the layer level of the parent domain of its own switch (step S137). As described above, even when its own domain is the root domain, the layer level of its own domain is "1". Therefore, there is no inconsistency when the layer level of the parent domain is "0". Moreover, "0" is set to other domains, which means that the layer level is unknown.

After that, the second processing unit 112 transmits a first message to be notified to the adjacent domains, which includes the layer level of its own switch, to switches in all of the adjacent domains (step S139). The second processing unit 112 transmits the message through the switch hardware 130 and appropriate ports.

After that, the second processing unit 112 determines whether or not the notification flag has been set by the notification processing B (step S141). That the notification flag has been set means that this is a timing to transmit a second message to be notified to switches in its own domain, which will be explained later, and the message to be notified to the adjacent domains. When the notification flag has not been set, the second processing unit 112 waits for a predetermined time (for example, 1 second. However, this is to reduce the load of the processor, and different time may be employed.) (step S143), and the processing returns to the step S141. In other words, until the notification flag is set, the second processing unit 112 waits for.

On the other hand, when the notification flag has been set, the second processing unit 112 clears the notification flag, and after that, the second processing unit 112 transmits the second message to be notified to the switches in its own domain, which includes the layer level after the change and the domain number of the parent domain after change, to all switches (including its own switch) within its own domain (step S145). Thus, the second message to be notified to the switches in its own domain is a message for notifying switches within its own domain of the layer level and domain number of the parent domain.

Then, the processing returns to the step S139, and because the update of the layer level of its own switch is notified, the first message to be notified to the adjacent domains is transmitted again.

Next, the notification processing B will be explained by using FIGS. 14 to 19. When the second processing unit 112 receives a message from another switch (FIG. 14: step S151), the second processing unit 112 determines whether or not the received message is the first message, which was notified to the adjacent domains (step S153). When the received message is not the first message, the processing shifts to the processing in FIG. 17 through terminal A.

On the other hand, when the received message is the first message, the second processing unit 112 determines whether or not the layer level of its own switch is "0" and the layer level included in the received message is other than "0" (step S155). In other words, it is determined whether or not a case is applicable that the layer level of its own switch is not determined and the layer level was determined in the adjacent domain.

When this condition is satisfied, the second processing unit 112 sets "layer level in the message +1" as the layer level of its own switch (step S157). Then, the second processing unit 112 sets the domain number of the transmission source domain in the received message as the parent domain number (step S159). In other words, the transmission-source adjacent domain of the received message is set as the parent domain. Then, the processing shifts to step S167.

On the other hand, when the condition of the step S155 is not satisfied, the second processing unit 112 determines whether or not the layer level in the received message is "0" (step S161). It is determined whether or not the layer level of the adjacent domain is unsettled. When this condition is not satisfied, the processing shifts to a processing in FIG. 15 through terminal B.

On the other hand, when the condition of the step S161 is satisfied, the second processing unit 112 determines whether or not the parent domain number is identical to the domain number of the transmission-source adjacent domain of the received message (step S163). It is determined whether or not the layer level of the adjacent domain, which was set as the parent domain, is not unsettled. For example, a state is assumed that there is no path from the root domain, because any cable is disconnected or failure occurs in the switch. When this condition is satisfied, the second processing unit 112 sets "0" as the layer level of its own switch (step S165). Then, the second processing unit 112 sets the notification flag (step S167). After that, the processing shifts to a processing in FIG. 17 through the terminal A. On the other hand, when the condition of the step S163 is not satisfied, the processing shifts to the step S167. When the layer level of the adjacent domain, which is not the parent domain, becomes unsettled, it means that there is a domain whose layer level is unsettled. Therefore, the state of its own switch is not changed. However, because the layer level of the adjacent domain is "0" and unsettled, information used to determine the layer level of the adjacent domain is notified by sending the information about the layer level of its own domain. Thus, it is possible to change the layer level state to cope with the addition of the domain or failure of the parent domain side.

Figure 15:
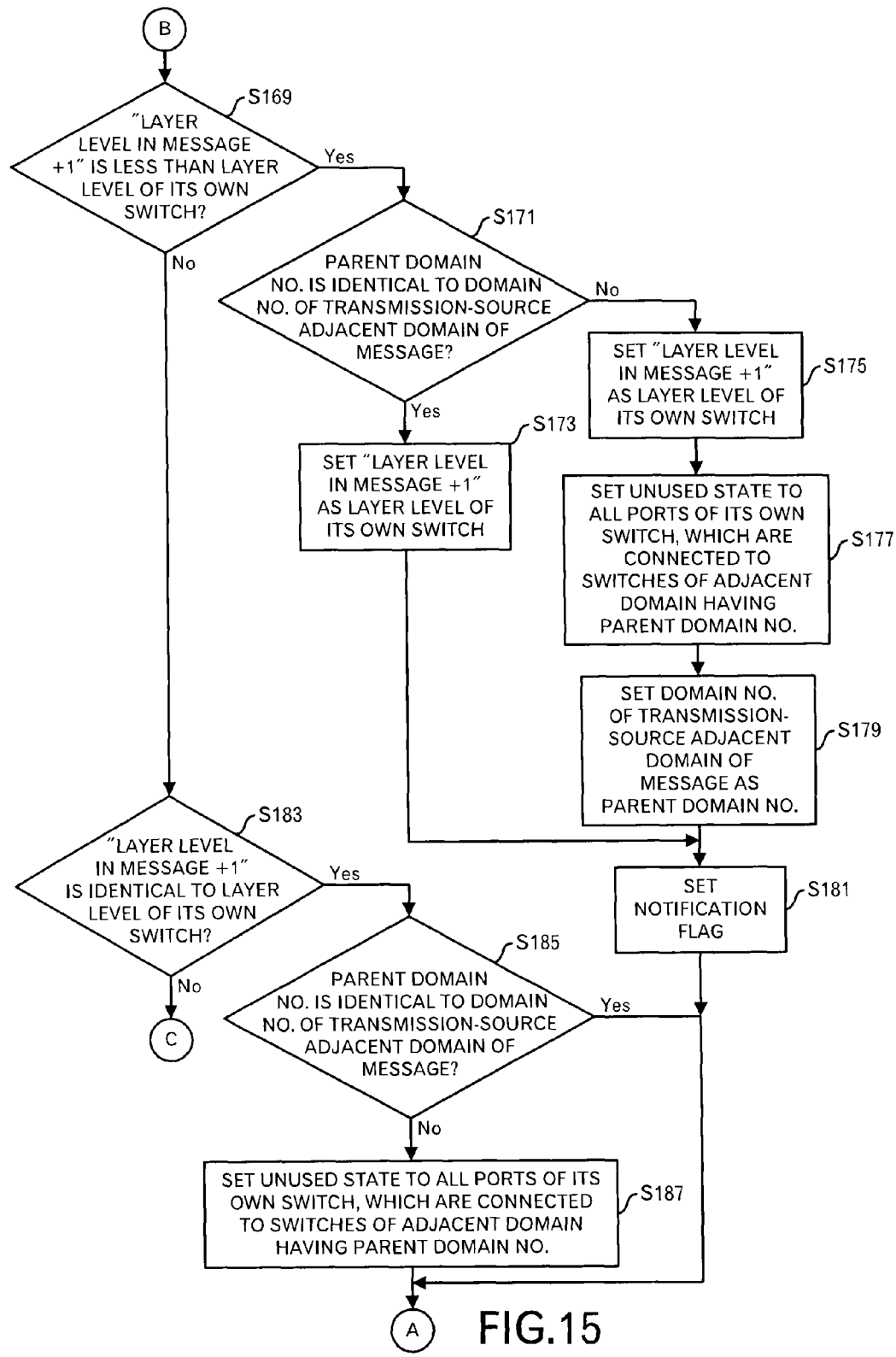
FIG. 15 is a diagram depicting a processing flow of the notification processing B relating to the second embodiment.

A processing after the terminal B will be explained by using FIG. 15. The second processing unit 112 determines whether or not "the layer level in the received message +1" is less than the layer level of its own switch (step S169). It is determined whether or not a route to the root domain, which is shorter than the current route, was found. When this condition is satisfied, the second processing unit 112 determines whether or not the parent domain number is identical to the domain number of the transmission-source adjacent domain of the received message (step S171). It is determined whether or not the layer level of the parent domain was changed. When this condition is satisfied, the second processing unit 112 sets "the layer level in the received message +1" as the layer level of its own switch (step S173). Namely, the parent domain is not changed, however, the layer level was changed. Then, the processing shifts to step S181.

On the other hand, when the parent domain number is not identical to the domain number of the transmission-source adjacent domain in the received message, it means that the shortest route that passes through a parent domain different from the current parent domain has been found. Then, the second processing unit 112 sets "the layer level in the received message +1" as the layer level of its own switch (step S175). Moreover, the second processing unit 112 causes the switch hardware 130 to set the unused state to all ports of its own switch, which is connected to the switch of the adjacent domain that has the parent domain number (step S177). Because the parent domain is changed, the communication with the adjacent domain, which was the parent domain, is blocked, and the tree structure is maintained. This is because, in the tree structure, the parent domain is only one. Furthermore, the second processing unit 112 sets the domain number of the transmission-source adjacent domain of the received message as the parent domain number (step S179), and sets the notification flag (step S181). After that, the processing shifts to a processing in FIG. 17 through the terminal A.

On the other hand, when the condition of the step S169 is not satisfied, the second processing unit 112 determines whether or not "the layer level in the received message +1" is identical as the layer level of its own switch (step S183). This is performed to determine whether or not a route was found, which is different from the current route to the root domain through the current parent domain, however, whose distance to the root domain is the same as that of the current route. When this condition is not satisfied, the processing shifts to the processing in FIG. 16 through terminal C. On the other hand, when this condition is satisfied, the second processing unit 112 determines whether or not the parent domain number is identical to the domain number of the transmission-source domain of the received message (step S185). When they are the same, this is a case where a message representing the same state was received. Therefore, the processing shifts to the processing in FIG. 17 through the terminal A.

On the other hand, when the condition of the step S185 is not satisfied, the second processing unit 112 causes the switch hardware 130 to set the unused state to all ports of its own switch, which are connected to switches of the adjacent domain having the parent domain number, in order to exclude the adjacent domain that transmitted the first message this time from the tree structure (step S187). This is because the parent domain is only one in the tree structure. Then, the processing shifts to the processing in FIG. 17 through the terminal A.

Figure 16:
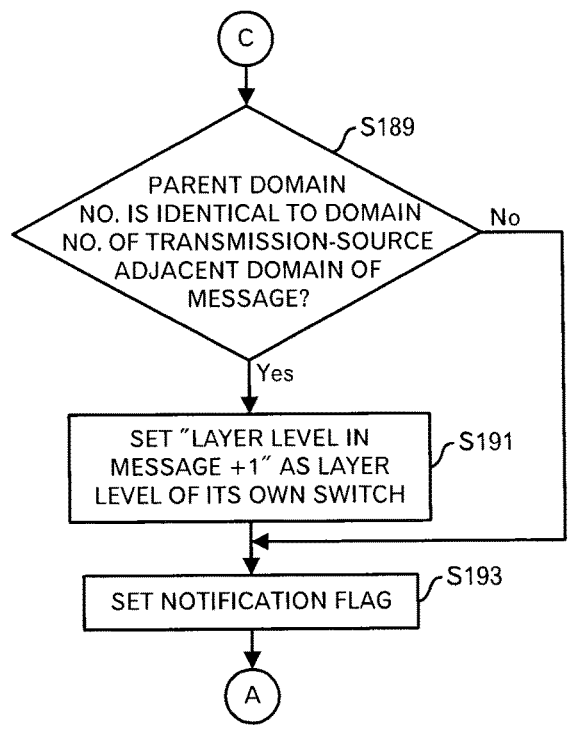
FIG. 16 is a diagram depicting a processing flow of the notification processing B relating to the second embodiment.

The processing after the terminal C will be explained by using FIG. 16. The second processing unit 112 determines whether or not the parent domain number is identical to the domain number of the transmission-source domain of the received message (step S189). This is performed to determine whether or not the first message was received from the parent domain in case where "the layer level in the received message +1" is greater than the layer level of its own switch. When this condition is not satisfied, a new route that reaches the root domain was found, however, the distance to the root domain is longer. Then, the processing shifts to the step S193. Because the transmission-source domain of the first message determines that the route to the root domain, in which its own domain is used as the parent, is shorter, the unused state is not set to the port connected to the transmission-source adjacent domain.

On the other hand, when the condition of the step S189 is satisfied, the layer of the parent domain has been changed. Therefore, the second processing unit 112 sets "the layer level in the received message +1" as the layer level of its own switch (step S191). Then, the second processing unit 112 sets the notification flag (step S193).

As a result, it is possible to autonomously identify the parent domain in each switch and set the layer level, and it is possible to set the unused state to the link having inconsistency on the building of the tree structure.

Figure 19:
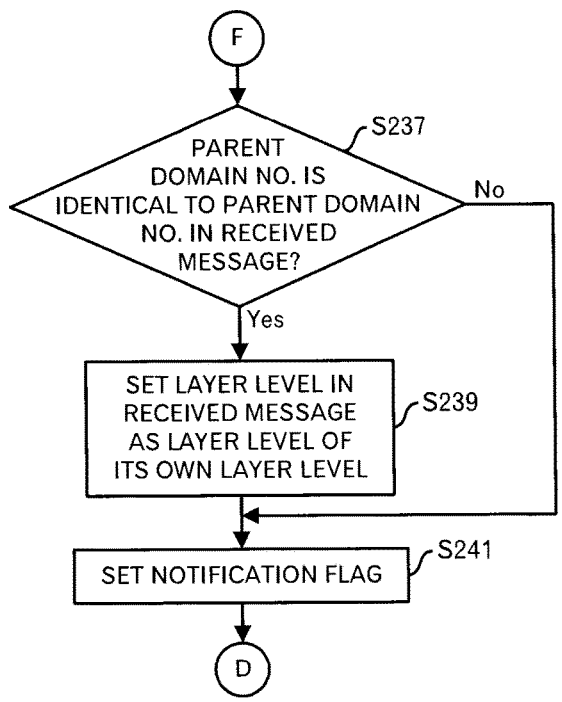
FIG. 19 is a diagram depicting a processing flow of the notification processing B relating to the second embodiment.
Figure 17:
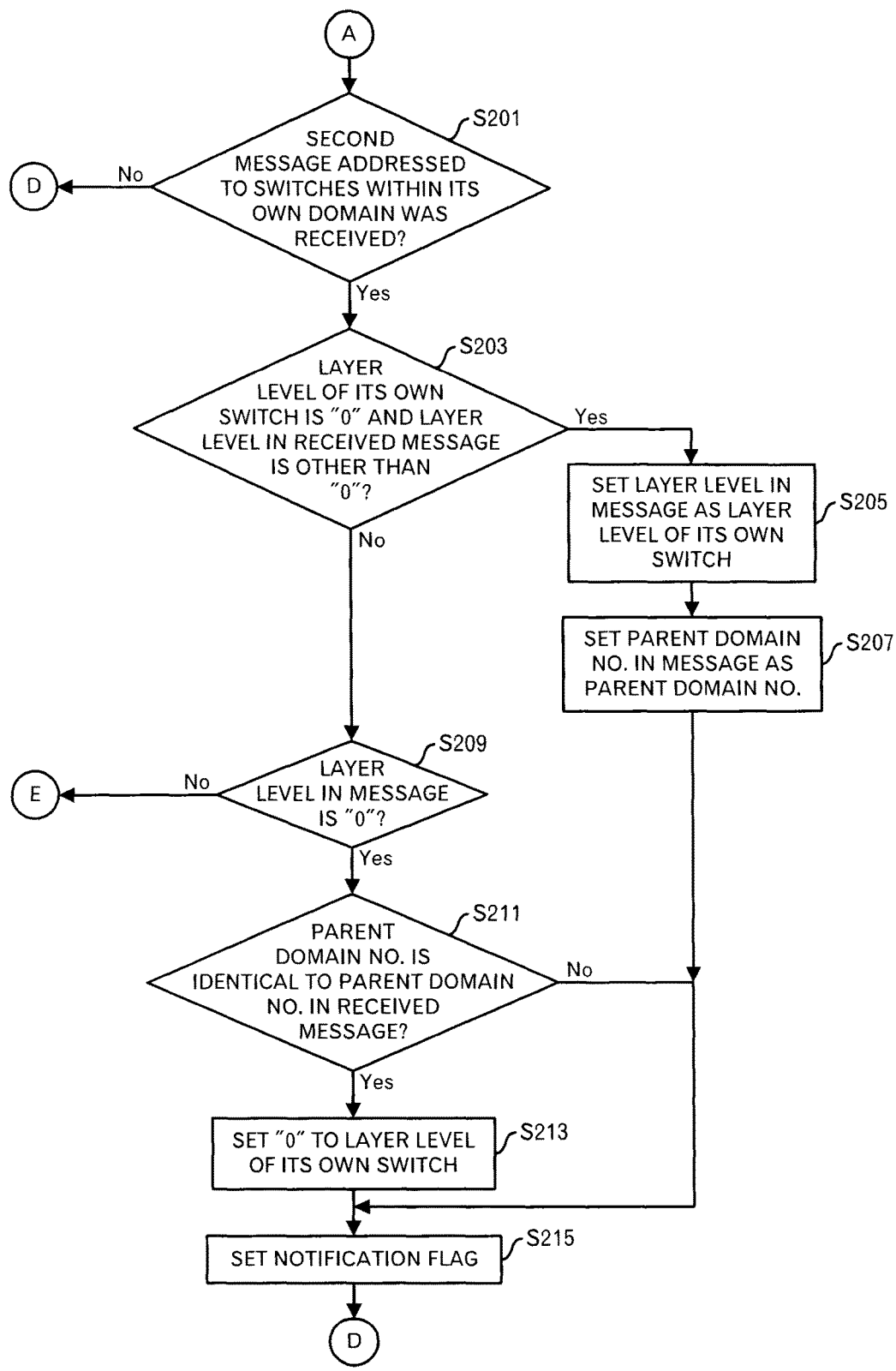
FIG. 17 is a diagram depicting a processing flow of the notification processing B relating to the second embodiment.
Figure 18:
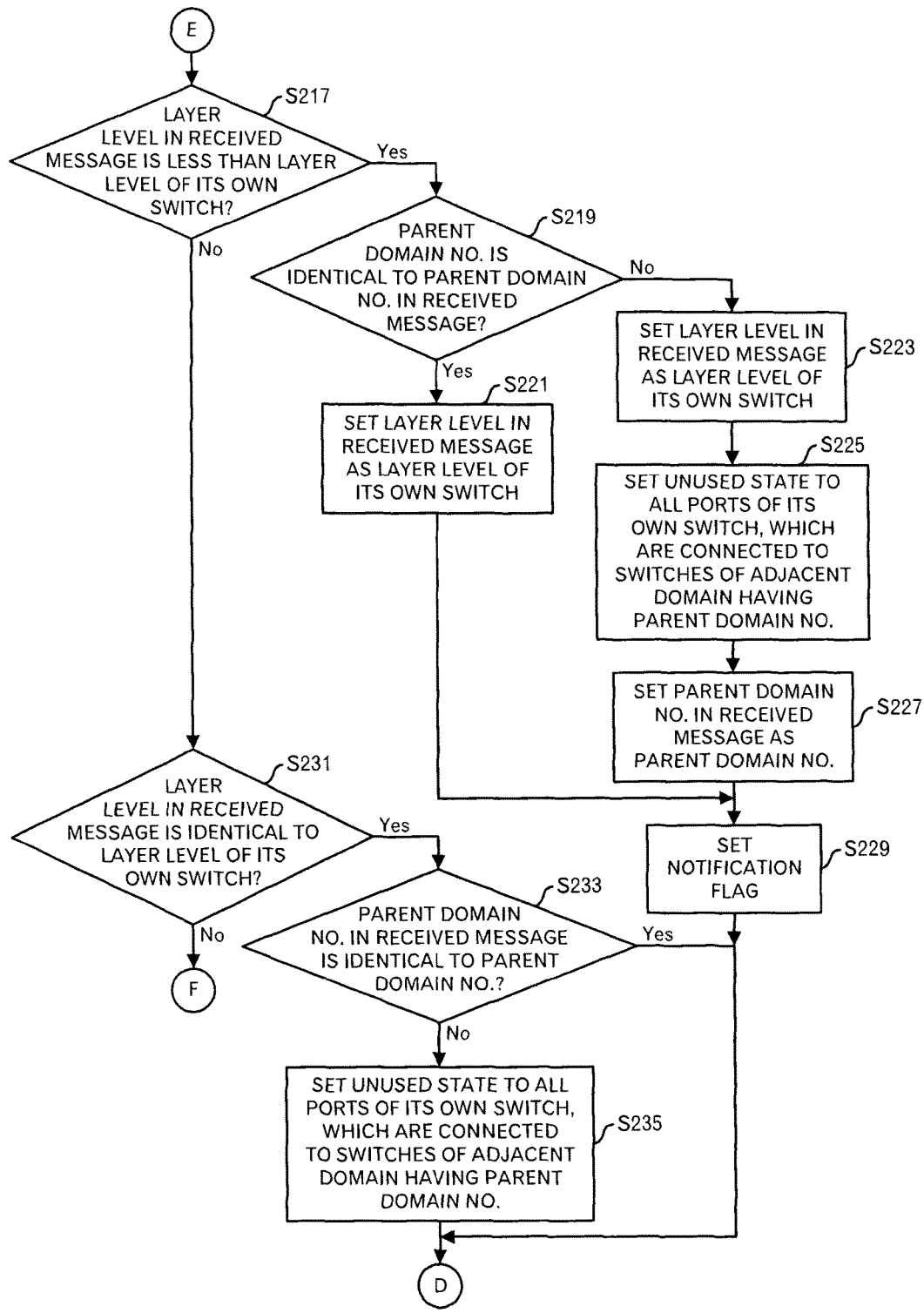
FIG. 18 is a diagram depicting a processing flow of the notification processing B relating to the second embodiment.

The processing after the terminal A is a processing when the second message that was transmitted within its own domain was received, and will be explained by using FIGS. 17 to 19. This processing is similar to the processing when the first message was received, however, because the notification is transmitted within its own domain, there is a difference portion. In the following, the processing will be explained in detail.

The second processing unit 112 determines whether or not the received message is the second message that was addressed to the switches within its own domain (step S201). When the received message is not the second message, the processing returns to the processing in FIG. 14 through terminal D.

On the other hand, when the received message is the second message that was addressed to the switches in its own domain, the second processing unit 112 determines whether or not the layer level of its own switch is "0" and the layer level in the received message is other than "0" (step S203). It is determined whether or not this corresponds to a case where the layer level of its own switch is unsettled, and the layer level is determined in other switches of its own domain.

When this condition is satisfied, the second processing unit 112 sets the layer level in the received message as the layer level of its own switch (step S205). Then, the second processing unit 112 sets the parent domain number in the received message as the parent domain number (step S207). After that, the processing shifts to the step S215.

On the other hand, when the condition of the step S203 is not satisfied, the second processing unit 112 determines whether or not the layer level in the received message is "0" (step S209). It is determined whether or not the layer level of other switches in its own domain is unsettled. When this condition is not satisfied, the processing shifts to a processing in FIG. 18 through terminal E.

On the other hand, when the condition of the step S209 is satisfied, the second processing unit 112 determined whether or not the parent domain number is identical to the parent domain number in the received message (step S211). It is determined whether or not the layer level of the adjacent domain set as the parent domain becomes unsettled. For example, a state is detected that the cable is disconnected or any failure of the switch occurs, accordingly, the path from the root domain is missed. When this condition is satisfied, the second processing unit 112 sets "0" as the layer level of its own switch (step S213). Then, the second processing unit 112 sets the notification flag (step S215). After that, the processing returns to the processing in FIG. 14 through the terminal D.

On the other hand, when the condition of the step S211 is not satisfied, the processing shifts to the step S215. When the layer level of the adjacent domain, which is not the parent domain, becomes unsettled, it only means that there is a domain whose layer level is unsettled. Therefore, the state of its own switch is not changed. However, because the layer level of the adjacent domain is "0" and unsettled, information used to determined the layer level of the adjacent domain is notified by sending the information about its own domain. Thus, it becomes possible to change the layer state to cope with the addition of the domain or failure of the parent domain side.

Next, the processing after the terminal E will be explained by using FIG. 18.

The second processing unit 112 determines whether or not the layer level in the received message is less than the layer level of its own switch (step S217). It is determined whether or not a route to the root domain, which is shorter than the current route, was found. When this condition is satisfied, the second processing unit 112 determines whether or not the parent domain number is identical to the parent domain number in the received message (step S219). It is determined whether or not the layer level of the parent domain was changed. When this condition is satisfied, the second processing unit 112 sets the layer level in the received message as the layer level of its own switch (step S221). In other words, the parent domain is not changed, however, the layer level was changed. Then, the processing shifts to step S229.

On the other hand, when the parent domain number is not identical to the parent domain number in the received message, this means that the shortest route that passes through another parent domain, which is different from the current parent domain, was found. Then, the second processing unit 112 sets the layer level in the received message as the layer level of its own switch (step S223). Moreover, the second processing unit 112 causes the switch hardware 130 to set the unused state for all ports of its own switch, which are connected to the switches of the adjacent domain having the parent domain number (step S225). Because the parent domain is changed, the communication with the adjacent domain that was the parent domain is blocked, and the tree structure is maintained. This is because the parent domain is only one in the tree structure. Furthermore, the second processing unit 112 sets the domain number in the received message as the parent domain number (step S227), and sets the notification flag (step S229). After that, the processing returns to the processing in FIG. 14 through the terminal D.

On the other hand, when the condition of the step S217 is not satisfied, the second processing unit 112 determines whether or not the layer level in the received message is identical to the layer level of its own switch (step S231). This is performed to determine whether or not another path was found that is different from the path that reaches the root domain through the current parent domain, and has the same distance to the root domain. When this condition is not satisfied, the processing shifts to a processing in FIG. 19 through terminal F. On the other hand, when this condition is satisfied, the second processing unit 112 determines whether or not the parent domain number is identical to the parent domain number in the received message (step S233). When they are the same, the message representing the same state is merely received. Therefore, the processing returns to the processing in FIG. 14 through the terminal D.

On the other hand, when the condition of the step S233 is not satisfied, the second processing unit 112 causes the switch hardware 130 to set the unused state to all ports of its own switch, which are connected to the switches of the adjacent domain having the parent domain number, in order to exclude the adjacent domain that transmitted the second message addressed to the switches in its own domain this time from the tree structure (step S235). This is because the parent domain is only one in the tree structure. Then, the processing returns to the processing in FIG. 14 through the terminal D.

The processing after the terminal F will be explained by using FIG. 19. The second processing unit 112 determines whether or not the parent domain number is identical to the parent domain number in the received message (step S237). This is performed to determine whether or not the second message was received from the parent domain in a state that the layer level in the received message is greater than the layer level of its own switch. When this condition is not satisfied, this means that a new route that reaches the root domain was found, however, the distance to the root domain is longer. Then, the processing shifts to step S241.

On the other hand, when the condition of the step S237 is satisfied, this means that the layer of the parent domain was changed. Therefore, the second processing unit 112 sets the layer level in the received message as the layer level of its own switch (step S239). Then, the second processing unit 112 sets the notification flag (step S241). After that, the processing returns to the processing in FIG. 14 through terminal D.

As a result, it is possible to set the layer level even in its own domain and the parent domain appropriately, and built the tree structure.

Embodiment 3

In the first and second embodiments, the MLAG method (i.e. frames are outputted to anyone of plural links) is employed as the path control method. However, an End Host Mode (EHM) method may be desired to be employed.

In the EHM method, ports in the switch are separated to Uplink ports and Downlink ports, and one Uplink is associated with any of Downlinks and outside ports to block communication other than communication between the associated links. Thus, by fixing one Uplink used by each of Downlinks and outside ports, plural links are efficiently utilized.

Figure 20:
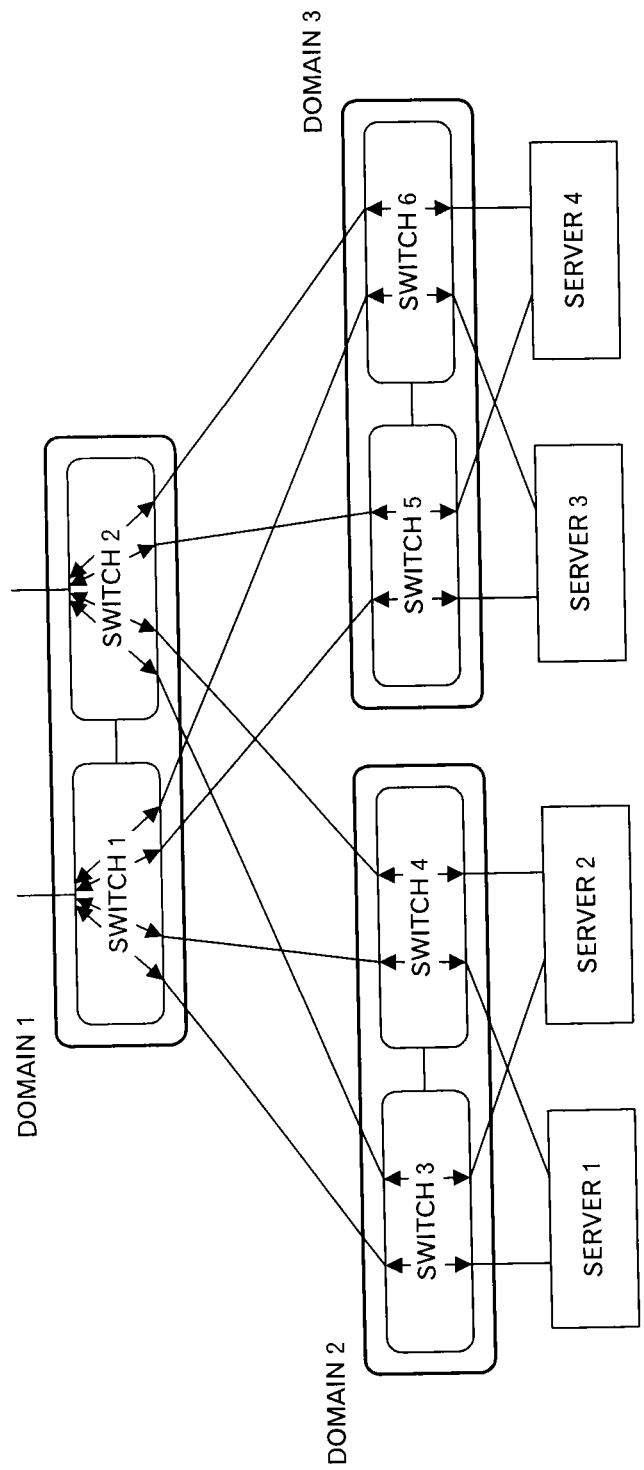
FIG. 20 is a diagram to explain an End Host Mode (EHM)

As illustrated in FIG. 20, an example will be considered that switches 1 and 2 are included in domain 1, which is a root domain, switches 3 and 4 are included in domain 2, which is a leaf domain, and switches 5 and 6 are included in domain 3, which is leaf domain. Moreover, in the switch 3, a Downlink port connected to server 1 is associated with an Uplink port connected to the switch 1 one-to-one, and a Downlink port connected to server 2 is associated with an Uplink port connected to switch 2 one-to-one. Furthermore, in the switch 4, a Downlink port connected to the server 1 is associated with an Uplink port connected to the switch 1 one-to-one, and a Downlink port connected to the server 2 is associated with an Uplink port connected to switch 2 one-to-one.

Moreover, in the switch 5, a Downlink port connected to server 3 is associated with an Uplink port connected to the switch 1 one-to-one, and a Downlink port connected to server 4 is associated with an Uplink port connected to the switch 2 one-to-one. Furthermore, in the switch 6, a Downlink port connected to the server 3 is associated with an Uplink port connected to the switch 1 one-to-one, and a Downlink port connected to the server 4 is associated with an Uplink port connected to the switch 2 one-to-one.

In addition, in the switch 1, a Downlink port connected to each of the switches 3 to 6 is associated with one Uplink port connected to a core network, and as one different association, in the switch 2, a Downlink port connected to each of the switches 3 to 6 is associated with one Uplink port connected to the core network.

In case where such EHM method is employed, the two-stage processing as illustrated in FIG. 4 is similarly performed. Furthermore, the domain building processing is the same as the first embodiment. Therefore, its explanation is omitted.

Next, a third Fabric building processing relating to this embodiment will be explained by using FIGS. 21 to 27. In this embodiment, a processing flow mainly executed by the master switch will be explained.

Figure 21:
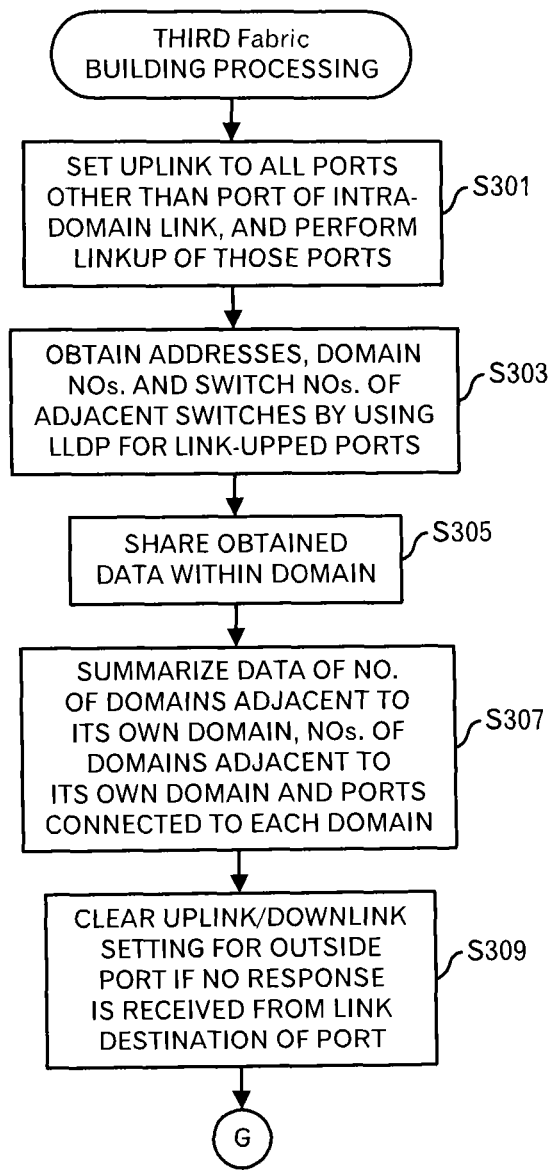
FIG. 21 is a diagram depicting a processing flow of the Fabric building processing relating to a third embodiment.

The second processing unit 112 of the controller 110 in each switch sets Uplink to ports other than ports for the intra-domain links, and causes the switch hardware 130 to perform link-up for those ports (FIG. 21: step S301). Uplink is set in the setting data for each applicable port in the memory 120.

Then, the second processing unit 112 causes the switch hardware 130 to obtain addresses, domain numbers, switch numbers and the like of the adjacent switches by using LLDP for the link-upped ports (step S303). More specifically, when the addresses are obtained, connection is made through appropriate ports and the switch hardware 130 with the addresses, and the domain numbers, switch numbers and the like are obtained.

After that, the second processing unit 112 shares the obtained data through the intra-domain links with other switches in the same domain (step S305). Then, the second processing unit 112 summarizes the number of domains that are adjacent to its own domain, the numbers of the domains that are adjacent to its own domain, and data of ports connected to each adjacent domain, and stores the summarized data into the memory 120 (step S307). Thus, data of the adjacent switch connected to each port of all switches in the domain (address, domain number, switch number and port number) is stored. Furthermore, a list of adjacent domain numbers, and data representing, for each adjacent domain, which combination of switch and port is connected to that adjacent domain are generated.

Moreover, the second processing unit 112 clears setting of Uplink or Downlink as an outside port when there is no response from the link destination of the link-upped port (step S309). However, as for the root domain, the setting of Uplink is left. Then, the processing shifts to a processing in FIG. 22 through terminal G. Then, for example, incase of the switch configuration as illustrated in FIG. 23A, the setting of Uplink is made except for the ports connected to the servers.

Figure 22:
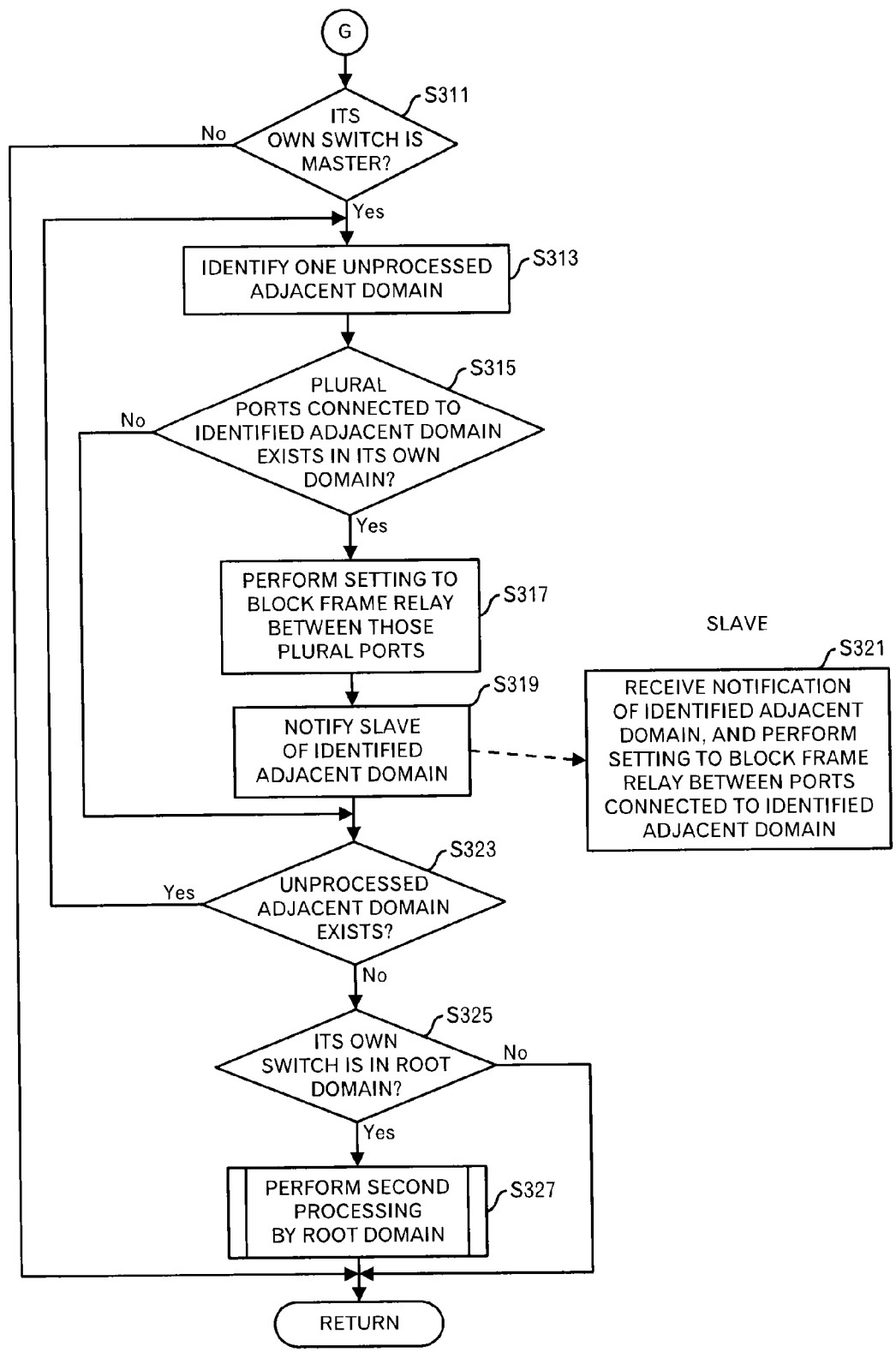
FIG. 22 is a diagram depicting a processing flow of the Fabric building processing relating to the third embodiment.
Figure 23A:
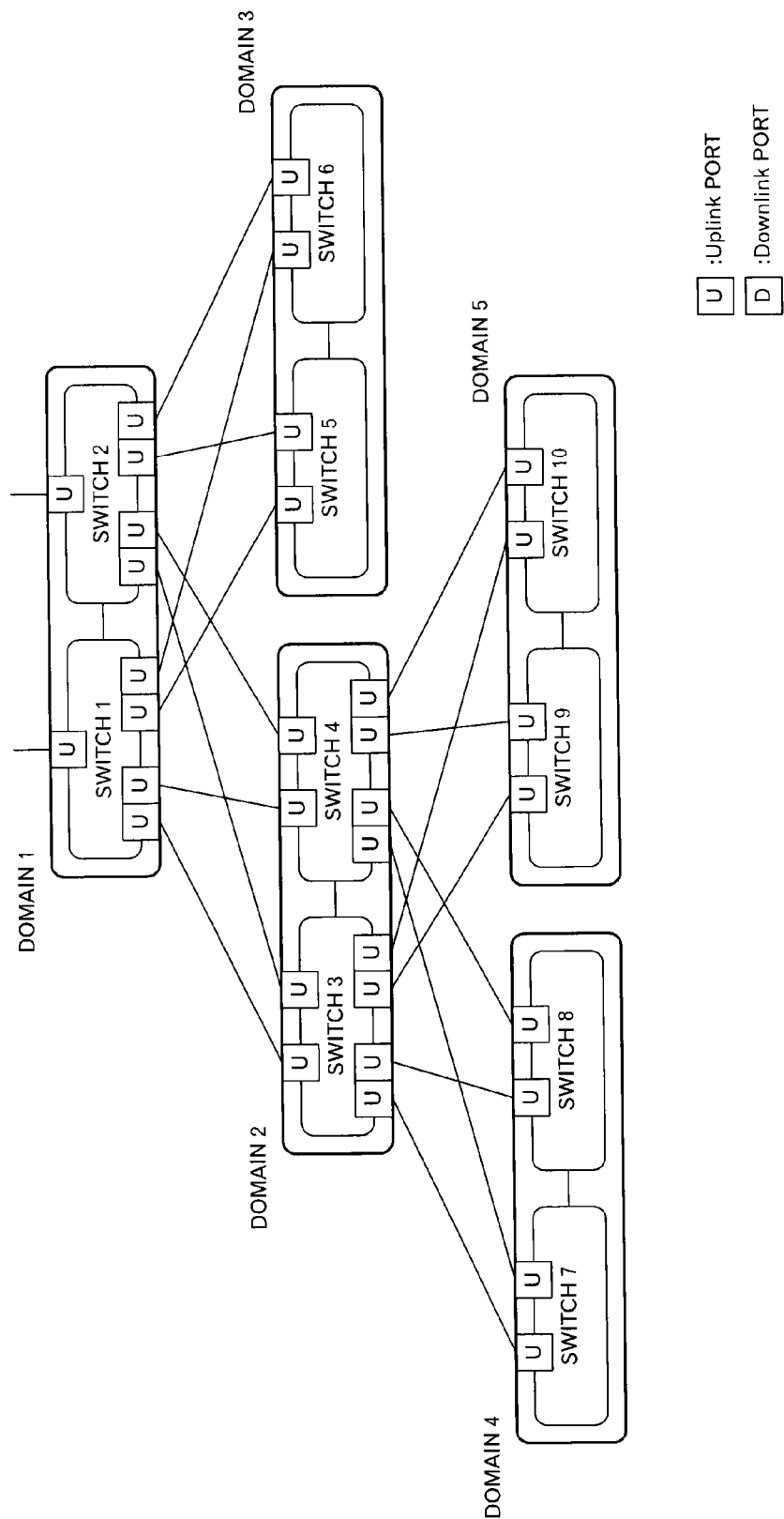
FIG. 23A is a diagram to explain a first state of a port setting.

Shifting to the explanation of FIG. 22, the second processing unit 112 determines whether or not its own switch is the master switch (step S311). When its own switch is not the master switch, the processing ends. On the other hand, when its own switch is the master switch, the second processing unit 112 of the controller 110 in the master switch of each domain identifies one unprocessed adjacent domain in the list of the adjacent domain numbers, which is stored in the memory 120 (FIG. 22: step S313). Then, the second processing unit 112 determines, based on data stored in the memory 120, whether or not there are plural ports (except the outside ports) connected to the identified adjacent domain within its own domain (step S315). From data representing, for each adjacent domain, which combination of the switch and port is connected to the adjacent domain, it is determined whether or not the plural ports are identified for the identified adjacent domain.

Then, when there are not plural ports that are within the its own domain and connected to the adjacent domain, the processing shifts to step S323. On the other hand, when there are plural ports that are within its own domain and connected to the adjacent domain, the second processing unit 112 performs setting to block frame relay between those ports (step S317).

When the applicable ports are included in the master switch, the switch hardware 130 is caused to perform the setting to block the frame relay between the applicable ports. When the port of the slave switch within its own domain is included in the applicable ports, the second processing unit 112 notifies the slave switch of the applicable adjacent domain through the intra-domain link (step S319). When the second processing unit 112 in the slave switch receives the notification of the applicable adjacent domain from the master switch, the second processing unit 112 causes the switch hardware 130 in its own switch to perform the setting to block the frame relay between the ports connected to the applicable adjacent domain (step S321).

In the EHM method, because Uplink and Downlink are associated basically one-to-one, the relay other than that association is never performed.

Then, the second processing unit 112 in the master switch determines whether or not there is an unprocessed adjacent domain in the list of the adjacent domain numbers (step S323). When there is an unprocessed adjacent domain, the processing returns to the step S313. On the other hand, when there is no unprocessed adjacent domain, the second processing unit 112 determines whether or not its own switch is the master switch in the root domain (step S325). When its own switch is not the master switch in the root domain, the processing returns to the calling-source processing.

On the other hand, when its own switch is the master switch in the root domain, the second processing unit 112 performs a second processing by the root domain (step S327). The second processing by the root domain will be explained by using FIGS. 23B to 27.

Figure 24:
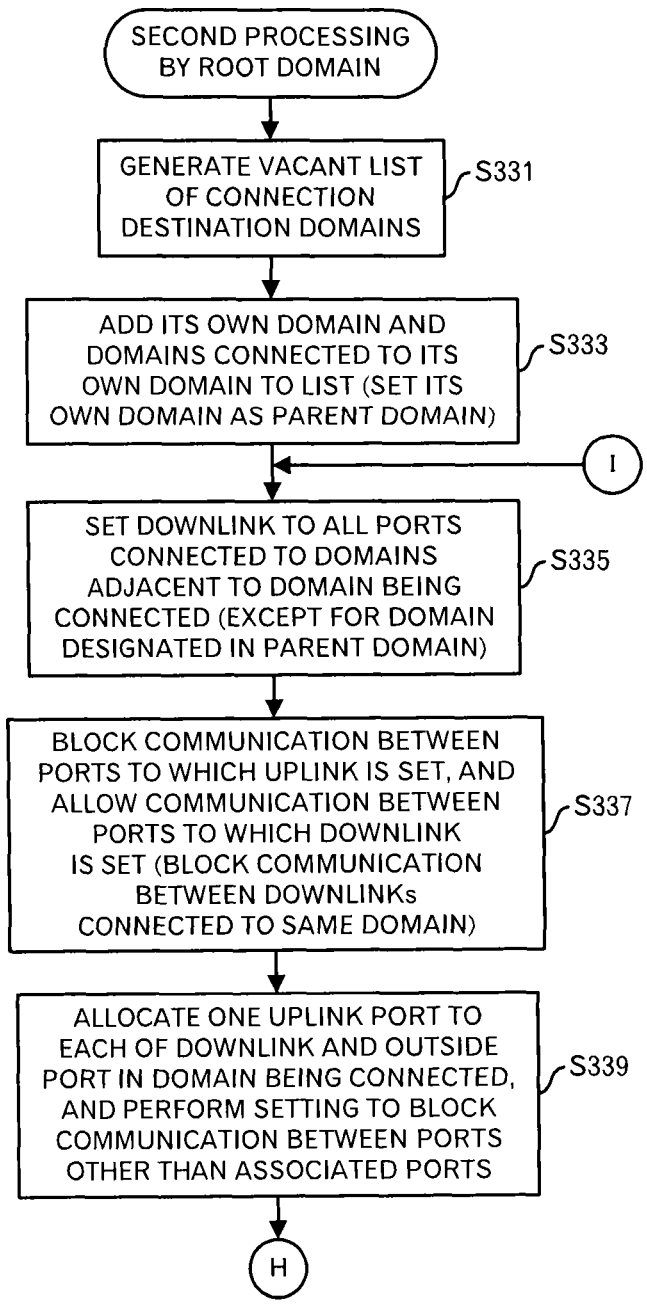
FIG. 24 is a diagram depicting a processing flow of a processing by the root domain, which relates to the third embodiment.

Next, the second processing by the root domain will be explained. The second processing unit 112 of the controller 110 in the root domain generates a vacant list of connection destination domains, for example, in the memory 120 (FIG. 24: step S331). Then, the second processing unit 112 adds its own domain (root domain) and domains adjacent to its own domain to the list of the connection destination domains, and sets its own domain (root domain) as the parent domain (step S333).

At the step S333, the list of the connection destination domains as illustrated in FIG. 25A is generated. In an example of FIG. 25A, the domain number, address of the master switch in that domain, parent domain and flag representing whether or not that domain has been visited are stored. At the step S333, the flag is set for the domain 1 that is the root domain, however, the flag is not set for other domains. Moreover, the domain 1 is set as the parent domain. At this stage, the domain being connected is the root domain.

Figure 23B:
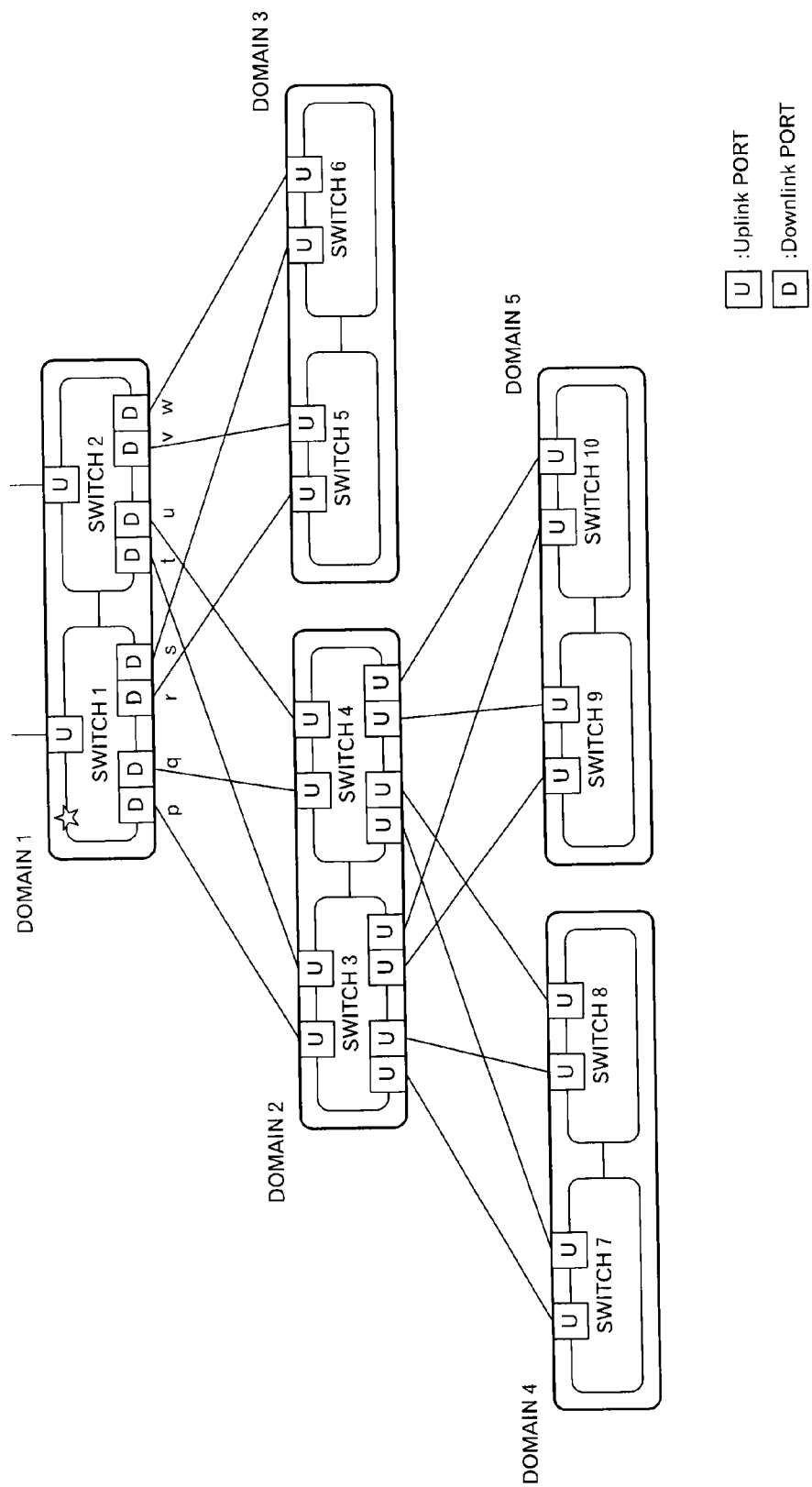
FIG. 23B is a diagram to explain a second state of the port setting.

After that, the second processing unit 112 sets Downlink to all ports that are connected to domains (except the domain at the present position) adjacent to the domain being connected (step S335). When the domain being connected is the root domain, the adjacent domains are domains 2 and 3, and Downlink is set to all ports connected to the domains 2 and 3 in the domain 1. Namely, a state as illustrated in FIG. 23B is obtained.

Then, the second processing unit 112 causes the switch hardware 130 to perform setting to block communication between ports to which Uplink is set and allow communication between ports to which Downlink is set (step S337). However, setting to block communication between Downlinks connected to the same domain is performed. In case of the domain 1 in FIG. 23B, there are 8 ports to which Downlink is set, however, the setting to block communication between two coupled ports (p and q, r and s, t and u and v and w) is performed. On the other hand, the communication is allowed between ports p and q and the other ports, between ports r and s and the other ports, between ports t and u and the other ports, port v and w and the other ports. As for Uplink, regardless of whether or not the port is connected to any domain, the communication between ports to which Uplink is set is blocked. As for each port of the slave switches, the second processing unit 112 of the master switch notifies data concerning the relay destination port to be blocked and relay destination port to be allowed through the intra-domain links.

Moreover, the second processing unit 112 allocates one Uplink port to each of the Downlinks and outside ports in the domain being connected, and causes the switch hardware 130 to perform setting to block communication other than communication between the associated ports (step S339). The processing shifts to a processing of FIG. 27 through terminal H. As for the allocation of the Uplink, one Uplink is allocated to the Downlink according to predetermined logic such as roundrobin so as to equally allocate the Downlink to any Uplink. In the example of FIG. 23B, 4 Downlink ports of the switch 1 are allocated to the Uplink port in the switch 1, and 4 Downlink ports of the switch 2 are allocated to the Uplink port in the switch 2.

Figure 26:
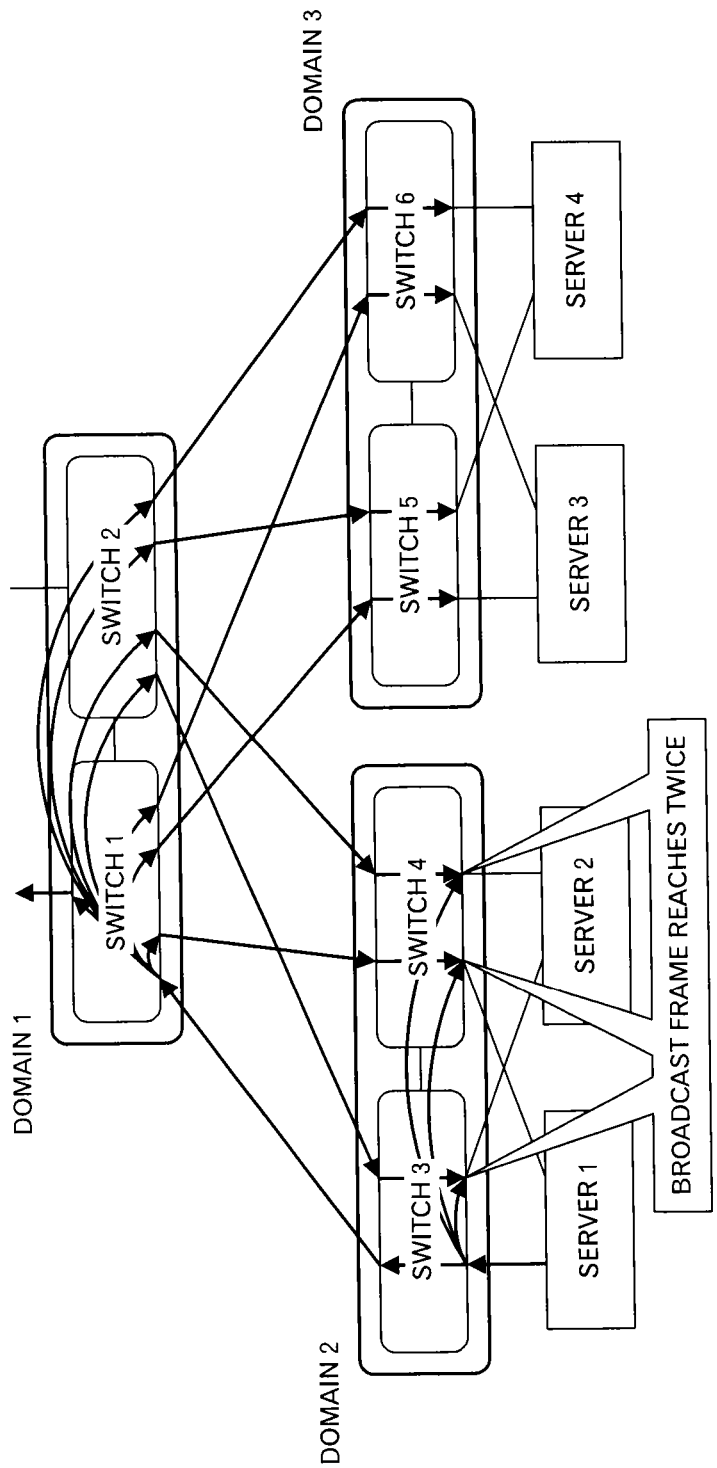
FIG. 26 is a diagram to explain increase of frames.

By carrying out such a processing, it is possible to output frames that reached from a certain adjacent domain to another domain, however, all communication to return to the same domain is blocked. This is because the frames are increased inside when the output to the same domain is allowed. In the existing EHM method, plural switches are not considered, and the existing EHM method cannot handle this point simply. More specifically, as illustrated in FIG. 26, when the broadcast frame is outputted from the server 1 and the relay of the frames to the same adjacent domain is allowed, the increase of the frames occurs. In this example, the switches 3 and 4 belong to the same domain. Therefore, the switches 3 and 4 locally relay to the servers 1 and 2 under the switch 4. Moreover, the switch 3 relays frames to the corresponding Uplink port, however, the relay destination domain 1 relays frames also to the transmission source domain as it is. Therefore, it can be understood that the frames are reached to the servers 1 and 2 under the switch 4 with the increase of the frames. As described above, by performing setting to block communication between Downlinks connected to the same domain, the frame does not return from the domain 1.

Figure 27:
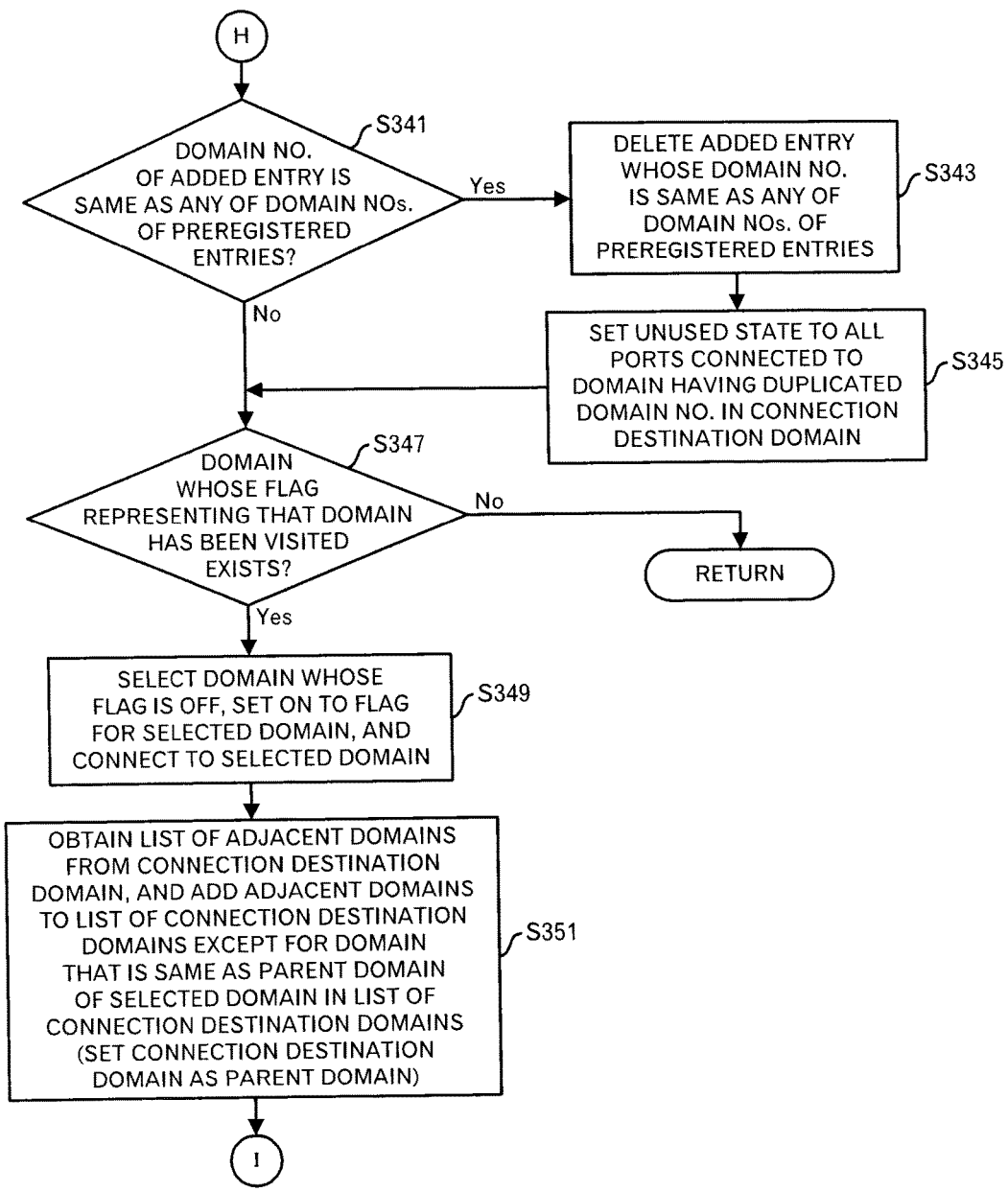
FIG. 27 is a diagram depicting a processing flow of a processing by the root domain, which relates to the third embodiment.

Then, the second processing unit 112 determines whether or not the domain number of the added entry is identical to any one of the domain numbers of the previously registered entries (FIG. 27: step S341). In case of FIG. 25A, it is determined that the domain number of the added entry is not identical. When it is determined that the domain number of the added entry is not identical, the second processing unit 112 determines whether or not there is a domain whose flag is not set in the list of the connection destination domains (step S347). When there is no domain whose flag is not set, the processing returns to the calling-source processing.

On the other hand, when there is a domain whose flag is not set, the second processing unit 112 selects one domain whose flag is not set in the list of the connection destination domains, sets the flag, and connects to the master switch of that domain (step S349). The second processing unit 112 connects to the master switch of the target domain through an appropriate port and the switch hardware 130. At this time, connection is established through the shortest path from the root domain to the master switch of the target domain.

Furthermore, the second processing unit 112 obtains a list of adjacent domains from the connection destination domain, adds the adjacent domains to the list of the connection destination domains except for the same domain as the parent domain of the entry selected in the list of the connection destination domains, and change the parent domain to the connection destination domain (step S351). Then, the processing returns to the step S335 in FIG. 24 through terminal I.

After FIG. 25A, when connecting to the domain 2, the flag is set for the domain 2. Furthermore, when a list of adjacent domains (domains 1, 4 and 5) is obtained from the domain 2 and the adjacent domain is added to the list of the connection destination domains except for the parent domain (here, root domain) of the connection destination domain (domain 2), a state as illustrated in FIG. 25B is obtained. The connection destination domain (domain 2) is registered as the parent domain of the added entry.

Figure 23C:
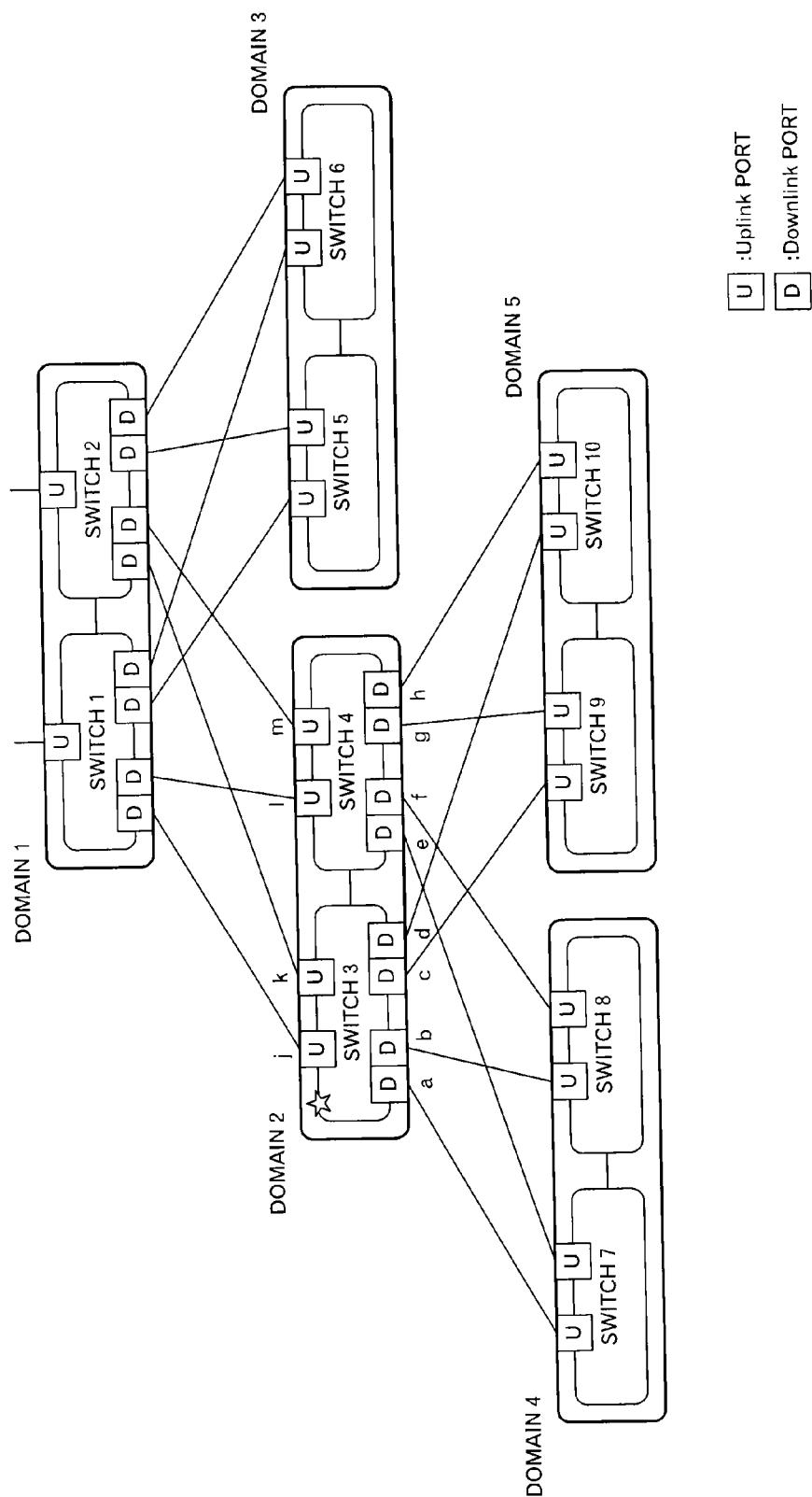
FIG. 23C is a diagram to explain a third state of the port setting.

Returning to the processing of the step S335, the connection destination domain is the domain 2. Therefore, Downlink is set to the ports connected to the adjacent domains 4 and 5 of the domain 2, as illustrated in FIG. 23C. Then, the communication between ports j to m to which Uplink is set in the domain 2 is blocked, the communication between ports a, b, e and f among ports a to h to which Downlink is set is blocked, and the communication between ports c, d, g and h is blocked. Then, for example, ports a and j are associated, ports b and k are associated, ports c and l are associated, ports d and m are associated, ports e and j are associated, ports f and k are associated, ports g and l are associated, and ports h and m are associated.

Then, after FIG. 25B, when connecting to the domain 3, the flag for the domain 3 is set. Furthermore, a list of adjacent domains (domain 1) is obtained from the domain 3, and no domain is added to the list of the connection destination domains except for the parent domain (domain 1) of the connection destination domain. Then, the list of the connection destination domains is as illustrated in FIG. 25C.

In the example of FIGS. 23A to 23C, the tree structure is made. Therefore, even when the domains 4 and 5 are processed, no domain is added to the list of the connection destination domains as illustrated in FIGS. 25D and 25E, and the flags are set in sequence.

Returning to the explanation of FIG. 27, when the domain number of the added entry is identical to any one of the domain numbers of the entries that have been registered, the second processing unit 112 deletes the added entry whose domain number is identical to any one of the domain numbers of the entries that have been registered, from the list of the connection destination domains (step S343). Then, the second processing unit 112 sets the unused state (blocking state) to all ports that are connected to the domain having the duplicate domain number in the connection destination domain (step S345). More specifically, because the connection to the master switch of the connection destination domain is made, when the port of the master switch is connected to the applicable domain, the second processing unit 112 causes the switch hardware 130 to set the unused state to the port connected to the applicable domain. Moreover, when the port of the slave switch is connected to the applicable domain, the second processing unit 112 causes the switch hardware 130 of the slave switch to set the unused state to the port connected to the applicable domain (domain having the duplicate domain number) through the intra-domain link. Then, the processing shifts to step S347.

By performing the aforementioned processing, the EHM method is realized.

Embodiment 4

In case of the MLAG method, an example is illustrated that the Fabric building processing is executed by exchanging messages between switches. However, even in case of the EHM method, the Fabric building processing will be executed by exchanging messages among switches.

Figure 28:
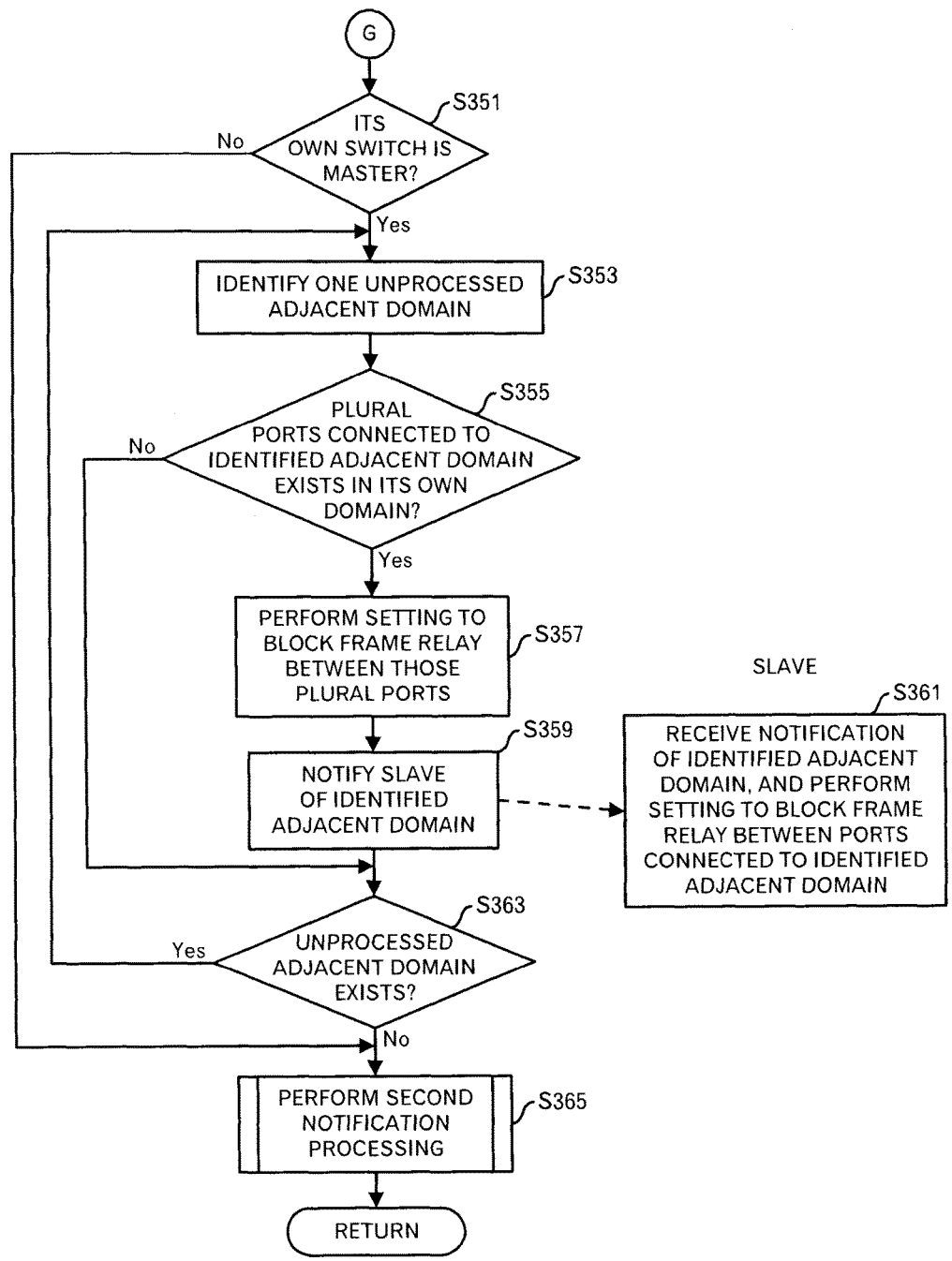
FIG. 28 is a diagram depicting a processing flow of the Fabric building processing relating to a fourth embodiment.

However, the steps S301 to S309 in the third Fabric building processing in the third embodiment are the same, so the explanation is omitted. Moreover, the processing after the terminal G (FIG. 28: steps S351 to S363) are the same as the step S311 to S323 in the FIG. 22, so the explanation is omitted.

After that, the second processing unit 112 performs a second notification processing (step S365). The second notification processing is the same as the notification processing A and B in the second embodiment, basically.

Figure 29:
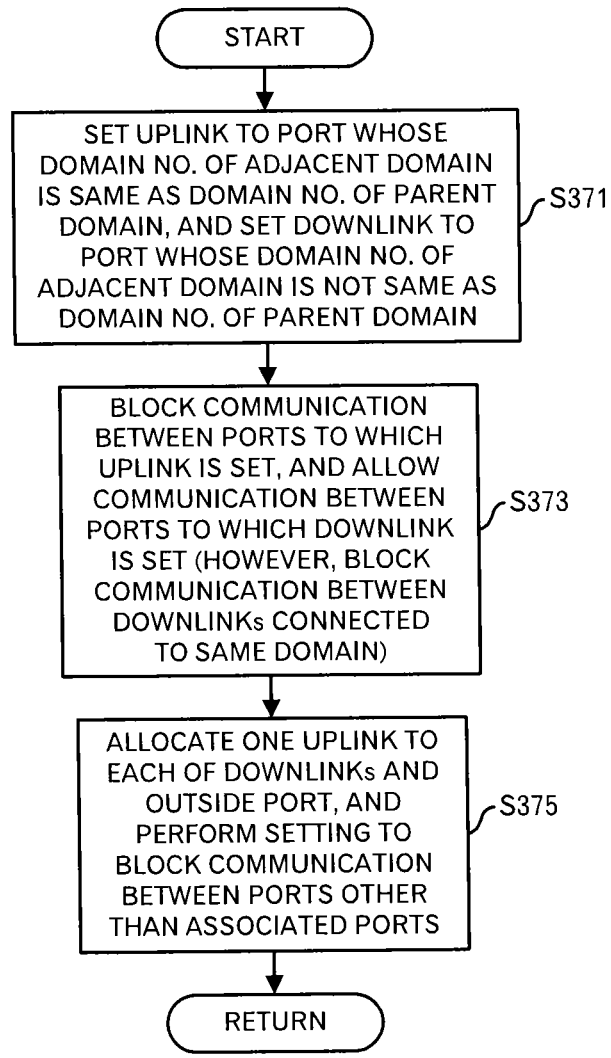
FIG. 29 is a diagram to explain a different portion from the notification processing in the second embodiment.

However, the setting of Uplink and Downlink and setting of the block and allowance of the frame relay are performed in the EHM method. Therefore, steps S371 to S375 illustrated in FIG. 29 are performed after the step S159 in FIG. 14, after the step S179 in FIG. 15, after the step S207 in FIG. 17, and after the step S227 in FIG. 18. Namely, after the parent domain is set, an additional processing is performed.

In other words, the second processing unit 112 sets Uplink to the port whose number of the adjacent switch is identical to the number of the parent domain, and sets Downlink to the port whose number of the adjacent switch is not identical to the number of the parent domain (step S371).

Then, the second processing unit 112 performs setting to block communication between ports to which Uplink is set, and setting to allow communication between ports to which Downlink is set (step S373). However, the setting to block communication between Downlinks connected to the same domain is performed. As for each port of the slave switch, the second processing unit 112 of the master switch notifies data concerning the relay destination port to be blocked and the relay destination port to be allowed through the intra-domain link.

Moreover, the second processing unit 112 allocates one Uplink port to each of the Downlink ports and outside ports in the domain being connected, and causes the switch hardware 130 to perform setting to block the communication between ports other than those associated ports (step S375). As for the allocation of the Uplink, one Uplink is allocated to Downlink according to predetermined logic such as roundrobin so that the Downlink is equally allocated to Uplinks.

By the aforementioned processing, it is possible to build the tree structure by exchanging messages among switches and perform the setting for the relay for the EHM method.

The number of types of network switches that are compatible with the Ethernet (registered trademark) and can perform the virtual integration of the switches by Fabric is increasing. However, there are various difficulties on the management and development. On the other hand, in this embodiment, the existing switch hardware is utilized to realize the two-stage virtual integration for causing the plural switches to be seen as one switch, while utilizing the virtual integration mechanism in the existing switch hardware. Therefore, it is possible to eliminate the aforementioned various difficulties.

Moreover, on the side of the efficient utilization of the plural paths, which is the feature of the Fabric, the domains, which are made by the virtual integration in the first stage, are built to the tree structure. Therefore, only plural links between the domains are considered to utilize the multipaths to make it easy to build the Fabric.

Furthermore, as a method for utilizing the multipaths, the MLAG or EHM method is used, and the Fabric building processing is automatically performed according to the designated method to overcome the difficulty of the various setting, and links that are not used in the tree structure are automatically detected to automatically maintain the tree structure. Moreover, in the conventional EHM method, incase of the plural-stage switch configuration such as the tree structure, there is a problem of the frame increase. However, it is possible to solve the problem of the frame increase by incorporating a processing to block only communication between the same domains into the Fabric building processing, and it is possible to establish the mechanism to block extra-communication without performing the manual setting.

Although the embodiments of the invention were explained, this invention is not limited to those embodiments. For example, the functional block configuration of the controller 110 in the switch 100 is a mere example, and may not correspond to the program module configuration.

As for the processing flow, as long as the processing result does not change, turns of steps may be exchanged and plural steps may be executed in parallel.

Figure 30:
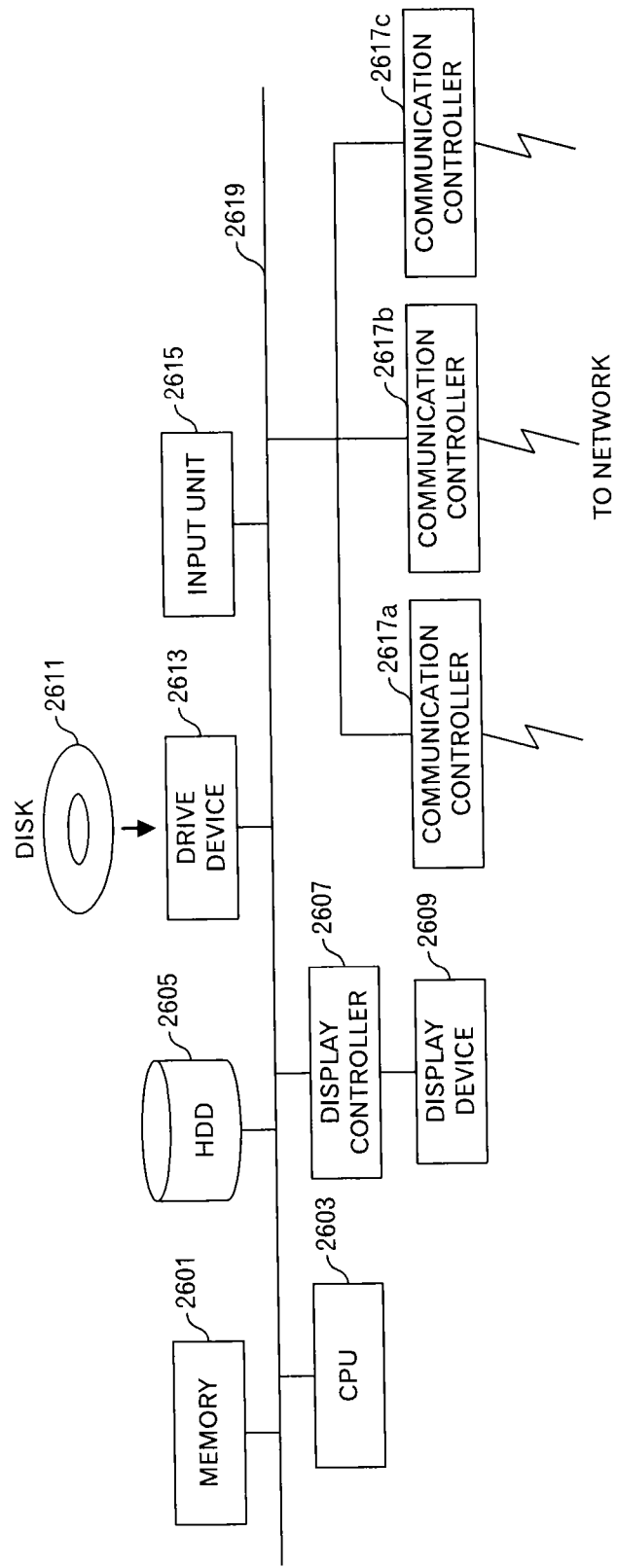
FIG. 30 is a functional block diagram in case where the switch is implemented by a computer.

In addition, the aforementioned switch 100 as illustrated in FIG. 30, a memory 2601, CPU 2603, Hard Disk Drive (HDD) 2605, display controller 2607 to be coupled with a display device 2609, drive device 2613 for a removable disk 2611, input device 2615 and communication controller 2617 (2617a to 2617c in FIG. 30) for coupling to a network may be coupled with a bus 2619. Incidentally, according to circumstances, the display controller 2607, display device 2609, drive device 2613 and input device 2615 may not be included. The OS and application programs for carrying out a processing in these embodiments are stored in the HDD 2605, and read out from the HDD 2605 to the memory 2601 when being executed by the CPU 2603. If necessary, the CPU 2603 controls the display controller 2607, communication controller 2617 and drive device 2613 to carryout necessary operations. Incidentally, data that was inputted through any one of the communication controller 2617 is outputted through another communication controller 2617. The CPU 2603 controls the communication controller 2617 to appropriately switch output destinations. In addition, data during the processing is stored in the memory 2601, and stored in the HDD 2605 if necessary. In the embodiments of this technique, the application programs for carrying out the aforementioned processing are distributed by a computer-readable removable disk 2611 storing the application programs, and the application programs are installed into the HDD 2605 through the drive device 2613. The programs may be installed into the HDD 2605 through the communication controller 2617 and the network such as the Internet. Such a computer apparatus realizes the aforementioned various functions by cooperating the hardware such as the CPU 2603, memory 2601 and the like with the OS and the application programs if necessary.

The aforementioned embodiments of this invention are outlined as follows:

A switch relating to the embodiments includes: (A) a plurality of ports that includes a first port to be connected to another switch included in a first domain that includes a plurality of switches to be virtually integrated among plural domains, and a second port that is other than the first port; (B) a first processing unit configured to obtain data of a switch included in the first domain through the first port; and (C) a second processing unit configured to obtain data of switches included in a second domain that is adjacent to the first domain through the second port and obtain data of switches included in the second domain from the another switch included in the first domain to identify, from among the plurality of ports, plural ports that are connected to the second domain, perform a setting for the identified plural ports, and perform a first processing to make the plural domains that include the first and second domains a tree structure.

By building the first domain by the first processing unit, appropriately setting plural paths between domains by the second processing unit and further making the plural domains a tree structure, it becomes possible to efficiently and easily build the Fabric network, and to effectively use the plural paths between domains.

In addition, the setting for the identified plural ports may be a setting to handle links connected to the identified plural ports as one virtual link. More specifically, the path control is performed according to the MLAG method.

In addition, according to the MLAG method, the first processing may include, in a case where the first domain is a root domain in the tree structure, and its own switch is a main switch in the first domain, a processing to (b1) collect data of third domains adjacent to a connection destination domain by connecting to an adjacent domain in sequence from the root domain, and to set a unused state to a port connected to a third domain that is connected through a path that comes off from the tree structure among ports included in switches included in the connection destination domain, upon detecting that the adjacent domain is connected to the third domain that is connected through the path that comes off from the tree structure.

The main switch in the root domain may mainly perform the processing to build the tree structure. Moreover, when a connection that comes off from the tree structure is included, the unused state is set to a port relating to the connection. Therefore, even in case where the physical connection is not appropriate, the tree structure is realized logically.

Moreover, in case of the MLAG method, the first processing may include a processing to (b2) identify a parent domain and a layer level in the tree structure by exchanging a layer level of its own switch in the tree structure with switches included in adjacent domains, and to (b3) update the parent domain and the layer level in the tree structure by exchanging a layer level and parent domain of its own switch after change in the tree structure with the another switch included in the first domain.

Thus, by the message exchange, the tree structure may be built.

Furthermore, in case where the MLAG method and message exchange method are employed, the aforementioned first processing may further include a processing to (b4) set the unused state to a port that is connected to an adjacent domain that was set as the parent domain in the tree structure, upon detecting a path whose number of layers to the root domain in the tree structure is lesser, and to (b5) set the unused state to a port that is connected to a third domain that is detected as a new parent domain, which is different from a current parent domain, upon detecting the third domain. A case where the physical connection is not appropriate can be handled.

Furthermore, the setting for the identified plural ports may be a setting to block frame relay between the plural ports. For example, in case of the EHM method, the frame relay is performed between the associated uplink and downlink, however, the frame relay is not performed between other links. Therefore, such a setting is made.

Moreover, for example, in case of the EHM method, the aforementioned first processing may include, in case where the first domain is a root domain in the tree structure and its own switch is a main switch in the first domain, a processing to (c1) collect data of third domains adjacent to a connection destination domain by connecting to an adjacent domain in sequence from the root domain, and to set a unused state to a port connected to a third domain that is connected through a path that comes off from the tree structure among ports included in switches included in the connection destination, upon detecting that the adjacent domain is connected to the third domain that is connected through the path that comes off from the tree structure.

Furthermore, the main switch of the root domain may mainly perform a processing to build the tree structure. Moreover, in case where there is a connection that comes off from the tree structure, by setting the unused state to the port, it becomes possible to realize the tree structure even in case where the physical connection is unappropriate.

In addition, for example, in case of the EHM method, the aforementioned first processing further may include: (c2) a processing to set an uplink to ports other than an outside port that is connected to an apparatus outside of the plurality of domains; (c3) a processing to change a port connected to a domain adjacent to the connection destination domain to a downlink from the uplink; (c4) a processing to perform a setting to block first frame relay between first ports to which the uplink is set and a setting to allow second frame relay between second ports to which the downlink is set, wherein the second ports are other than ports connected to a same adjacent domain; (c5) a processing to associate one port to which the uplink is set with each of ports to which the downlink is set and the outside port; and (c6) a processing to perform a setting to block third frame relay between a port to which the downlink is set or the outside port and a port to which the uplink is set, wherein the third frame relay is other than frame relay between associated ports.

Thus, for example, the setting processing for the EHM method is performed.

Moreover, the aforementioned first processing may include a processing to (c7) identify a parent domain and a layer level in the tree structure by exchanging a layer level of its own switch in the tree structure with switches included in adjacent domains, and to (c8) update the parent domain and the layer level in the tree structure by exchanging a layer level and parent domain of its own switch after change in the tree structure with the another switch included in the first domain.

As described above, the tree structure can be built by performing the message exchange.

Furthermore, for example, in case where the EHM method and message exchange method are employed, the aforementioned first processing may further include a processing to (c9) set the unused state to a port that is connected to an adjacent domain that was set as the parent domain in the tree structure, upon detecting a path whose number of layers to the root domain in the tree structure is lesser, and to (c10) set the unused state to a port that is connected to a third domain that is detected as a new parent domain, which is different from a current parent domain, upon detecting the third domain. Even when the physical connection is not appropriate, it is possible to handle such a case.

Furthermore, for example, in case where the EHM method and message exchange method are employed, the aforementioned first processing may further include: (c11) a processing to set an uplink to ports connected to a switch included in a parent domain in the tree structure and set a downlink to ports other than the ports to which the uplink is set; (c12) a processing to perform a setting to block first frame relay between first ports to which the uplink is set and a setting to allow second frame relay between second ports to which the downlink is set, wherein the second ports are other than ports connected to a same adjacent domain; (c13) a processing to associate one port to which the uplink is set with each of ports to which the downlink is set and the outside port; and (c14) a processing to perform a setting to block third frame relay between a port to which the downlink is set or the outside port and a port to which the uplink is set, wherein the third frame relay is other than frame relay between associated ports.

Accordingly, it is possible to perform the setting processing for the EHM method, for example.

Incidentally, it is possible to create a program causing a processor to execute the aforementioned processing, and such a program is stored in a computer readable storage medium or storage device such as a flexible disk, CD-ROM, DVD-ROM, magneto-optic disk, a semiconductor memory, (e.g. ROM) and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A switch, comprising:
a plurality of ports that include a first port to be connected to a first switch included in a first domain of a plurality of domains, each of which includes a plurality of switches that are set so as to operate as one switch while the plurality of switches are operating, and a second port to be connected with a second switch included in a second domain that is adjacent to the first domain; and
a processor configured to:
connect to the first switch included in the first domain via the first port and to the second switch included in the second domain via the second port,
identify plural ports that are connected to the second domain,
perform a setting for the identified plural ports, and
perform a first processing to generate a tree structure of the plurality of domains that include the first and second domains,
wherein the setting for the identified plural ports is a setting to handle links connected to the identified plural ports as one virtual link, and the first processing comprises a processing to:
collect, based on the first domain being a root domain in the tree structure, and the switch being a main switch in the first domain, data of third domains adjacent to a connection destination domain by connecting to an adjacent domain in sequence from the root domain, and
set an unused state to a port connected to a third domain that is connected through a path that comes off the tree structure among ports included in switches included in the connection destination, upon detecting that the adjacent domain is connected to the third domain that is connected through the path that comes off from the tree structure.

2. The switch as set forth in claim 1, wherein the switch is included in the first domain and the plural ports that are connected to the second domain from the first domain are identified.

3. A switch, comprising:
a plurality of ports that include a first port to be connected to a first switch included in a first domain of a plurality of domains, each of which includes a plurality of switches that are set so as to operate as one switch while the plurality of switches are operating, and a second port to be connected with a second switch included in a second domain that is adjacent to the first domain; and
a processor configured to:
connect to the first switch included in the first domain via the first port and to the second switch included in the second domain via the second port,
identify plural ports that are connected to the second domain,
perform a setting for the identified plural ports, and
perform a first processing to generate a tree structure of the plurality of domains that include the first and second domains,
wherein the setting for the identified plural ports is a setting to handle links connected to the identified plural ports as one virtual link, and the first processing comprises a processing to:
identify a parent domain and a layer level in the tree structure by exchanging a layer level of the switch in the tree structure with switches included in adjacent domains, and
update the parent domain and the layer level in the tree structure by exchanging a layer level and parent domain of the switch after change in the tree structure with the first switch included in the first domain.

4. The switch as set forth in claim 3, wherein the first processing comprises a processing to set an unused state to a port that is connected to an adjacent domain that was set as the parent domain in the tree structure, upon detecting a path whose number of layers to the root domain in the tree structure is lesser than a previously detected number of layers, and to set the unused state to a port that is connected to a third domain that is detected as a new parent domain, which is different from a current parent domain, upon detecting the third domain.

5. A switch, comprising:
a plurality of ports that include a first port to be connected to a first switch included in a first domain of a plurality of domains, each of which includes a plurality of switches that are set so as to operate as one switch while the plurality of switches are operating, and a second port to be connected with a second switch included in a second domain that is adjacent to the first domain; and
a processor configured to:
connect to the first switch included in the first domain via the first port and to the second switch included in the second domain via the second port,
identify plural ports that are connected to the second domain,
perform a setting for the identified plural ports, and
perform a first processing to generate a tree structure of the plurality of domains that include the first and second domains,
wherein the setting for the identified plural ports is a setting to block frame relay between the plural ports, and the first processing comprises a processing to:
collect, based on the first domain being a root domain in the tree structure and the switch being a main switch in the first domain, data of third domains adjacent to a connection destination domain by connecting to an adjacent domain in sequence from the root domain, and
set an unused state to a port connected to a third domain that is connected through a path that comes off from the tree structure among ports included in switches included in the connection destination domain, upon detecting that the adjacent domain is connected to the third domain that is connected through the path that comes off from the tree structure.

6. The switch as set forth in claim 5, wherein the first processing comprises a processing to:
set an uplink to ports other than an outside port that is connected to an apparatus outside of the plurality of domains,
change a port connected to a domain adjacent to the connection destination domain to a downlink from the uplink,
perform a setting to block first frame relay between third ports to which the uplink is set and a setting to allow second frame relay between fourth ports to which the downlink is set, wherein the fourth ports are other than ports connected to a same adjacent domain,
associate one port to which the uplink is set with each of ports to which the downlink is set and the outside port, and
perform a setting to block third frame relay between a port to which the downlink is set or the outside port and a port to which the uplink is set, wherein the third frame relay is other than frame relay between associated ports.

7. A switch, comprising:
a plurality of ports that include a first port to be connected to a first switch included in a first domain of a plurality of domains, each of which includes a plurality of switches that are set so as to operate as one switch while the plurality of switches are operating, and a second port to be connected with a second switch included in a second domain that is adjacent to the first domain; and
a processor configured to:
connect to the first switch included in the first domain via the first port and to the second switch included in the second domain via the second port,
identify plural ports that are connected to the second domain,
perform a setting for the identified plural ports, and
perform a first processing to generate a tree structure of the plurality of domains that include the first and second domains,
wherein the setting for the identified plural ports is a setting to block frame relay between the plural ports, and the first processing comprises a processing to:
identify a parent domain and a layer level in the tree structure by exchanging a layer level of the switch in the tree structure with switches included in adjacent domains, and
update the parent domain and the layer level in the tree structure by exchanging a layer level and parent domain of the switch after change in the tree structure with the another switch included in the first domain.

8. The switch as set forth in claim 7, wherein the first processing comprises a processing to set an unused state to a port that is connected to an adjacent domain that was set as the parent domain in the tree structure, upon detecting a path whose number of layers to the root domain in the tree structure is lesser than a previously detected number of layers, and to set the unused state to a port that is connected to a third domain that is detected as a new parent domain, which is different from a current parent domain, upon detecting the third domain.

9. The switch as set forth in claim 8, wherein the first processing comprises a processing to:
set an uplink to ports connected to a switch included in a parent domain in the tree structure and set a downlink to ports other than the ports to which the uplink is set,
perform a setting to block first frame relay between third ports to which the uplink is set and a setting to allow second frame relay between fourth ports to which the downlink is set, wherein the fourth ports are other than ports connected to a same adjacent domain,
associate one port to which the uplink is set with each of ports to which the downlink is set and the outside port, and
perform a setting to block third frame relay between a port to which the downlink is set or the outside port and a port to which the uplink is set, wherein the third frame relay is other than frame relay between associated ports.

10. A switch system, comprising:
a plurality of switches, wherein the plurality of switches are classified to a plurality of domains, each of which includes plural switches that are set so as to operate as one switch while the plural switches are operating, and wherein at least one of the plurality of switches includes:
a plurality of ports that include a first port to be connected to a first switch included in a first domain of the plurality of domains, and a second port to be connected with a second switch included in a second domain that is adjacent to the first domain; and
a processor configured to:

connect to the first switch included in the first domain via the first port and to the second switch included in the second domain via the second port, identify plural ports that are connected to the second domain, perform a setting for the identified plural ports, and perform a processing to generate a tree structure of the plurality of domains that include the first and second domains, wherein the setting for the identified plural ports is a setting to handle links connected to the identified plural ports as one virtual link, and the processing comprises a processing to:

collect, based on the first domain being a root domain in the tree structure, and the switch being a main switch in the first domain, data of third domains adjacent to a connection destination domain by connecting to an adjacent domain in sequence from the root domain, and set an unused state to a port connected to a third domain that is connected through a path that comes off from the tree structure among ports included in switches included in the connection destination, upon detecting that the adjacent domain is connected to the third domain that is connected through the path that comes off from the tree structure.

11. The switch system as set forth in claim 10, wherein the plural ports that are connected to the second domain from the first domain are identified.

12. A computer-readable, non-transitory storage medium storing a program for causing a processor of a switch apparatus to execute a process, the process comprising:

connecting to a first switch included in a first domain of a plurality of domains via a first port and to a second switch included in a second domain of the plurality of domains, wherein the first domain includes a plurality of switches that are set so as to operate as one switch while the plurality of switches are operating, the second domain is adjacent to the first domain, the switch apparatus comprises a plurality of ports that include the first port to be connected to the first switch included in the first domain, and the second port to be connected with the second switch included in the second domain;

identifying plural ports that are connected to the second domain;

performing a setting for the identified plural ports; and performing a processing to generate a tree structure of the plurality of domains that include the first and second domains, wherein the setting for the identified plural ports is a setting to handle links connected to the identified plural ports as one virtual link, and the processing comprises a processing to:

collect, based on the first domain being a root domain in the tree structure, and the switch being a main switch in the first domain, data of third domains adjacent to a connection destination domain by connecting to an adjacent domain in sequence from the root domain, and set an unused state to a port connected to a third domain that is connected through a path that comes off from the tree structure among ports included in switches included in the connection destination, upon detecting that the adjacent domain is connected to the third domain that is connected through the path that comes off from the tree structure.

13. The computer-readable, non-transitory storage medium as set forth in claim 12, wherein the switch apparatus is included in the first domain and the plural ports that are connected to the second domain from the first domain are identified.

* * * * *